Figure 1:
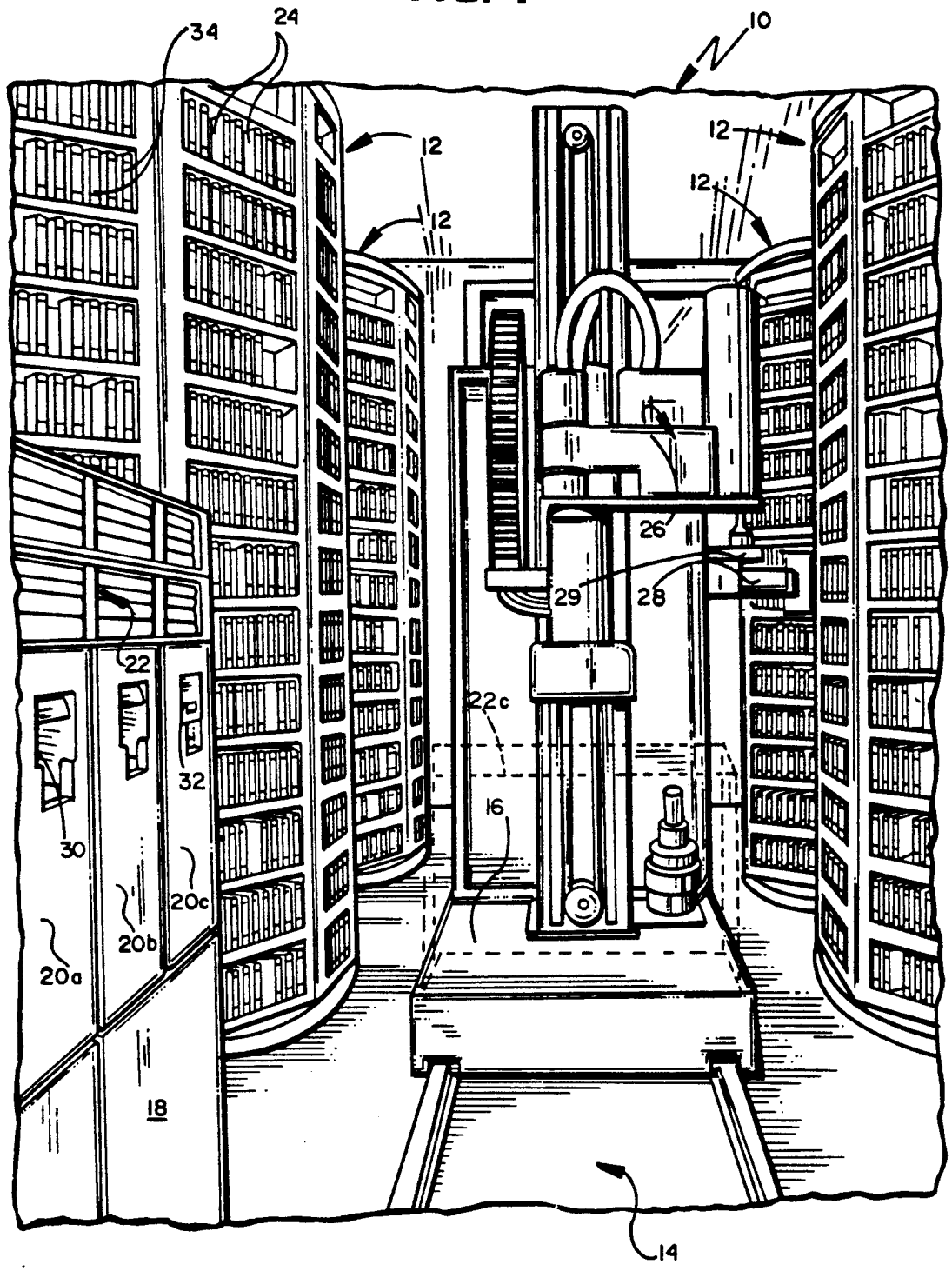

United States Patent [19]

Krayer et al.

[11] Patent Number: 5,291,001
[45] Date of Patent: Mar. 1, 1994

[54] PROCESS AND DEVICE FOR OPERATING AN AUTOMATIC DATA CARRIER ARCHIVE

[75] Inventors: Werner F. Krayer, Durlangen, Fed. Rep. of Germany; Rolf Baur, deceased, late of Heubach-Lautern, Fed. Rep. of Germany, by Helga Baur, executor

[73] Assignee: Grau GmbH & Co., Schwabish Gmund, Fed. Rep. of Germany

[21] Appl. No.: 776,886

[22] Filed: Oct. 17, 1991

Related U.S. Application Data

[63] Continuation of Ser. No. 573,186, Aug. 16, 1990, abandoned.

[30] Foreign Application Priority Data

Dec. 22, 1988 [DE] Fed. Rep. of Germany ....... 3843218

[51] Int. Cl.$^5$ ............................................. G06F 15/20
[52] U.S. Cl. ...................................... 235/375; 364/478

[56] References Cited

U.S. PATENT DOCUMENTS

| | | | |
|---|---|---|---|
| 729,642 | 6/1903 | Nash . | |
| 2,512,465 | 6/1950 | Moorhouse | 211/1.5 |
| 3,233,750 | 2/1966 | Bannon . | |
| 3,262,593 | 7/1966 | Hainer . | |
| 3,715,040 | 2/1973 | Polus et al. | 214/16.4 |
| 3,802,580 | 4/1974 | Castaldi | 214/16.4 |
| 3,822,025 | 7/1974 | Loos | 214/16.4 |
| 3,831,187 | 8/1974 | Beach et al. | 360/71 |
| 3,848,753 | 11/1974 | Borg et al. | 214/1 B |
| 3,881,053 | 4/1975 | Lemelson | 178/6.8 |
| 3,920,195 | 11/1975 | Sills et al. | 242/180 |
| 3,938,190 | 2/1976 | Semmlow et al. | 360/72 |
| 4,164,765 | 8/1979 | Gyjling | 360/92 |
| 4,219,296 | 8/1980 | Fujii et al. | 414/273 |
| 4,271,440 | 6/1981 | Jenkins et al. | 360/92 |
| 4,327,834 | 5/1982 | Kaithoff et al. | 209/609 |
| 4,621,711 | 11/1986 | Miyashige et al. | 187/9 |
| 4,626,160 | 12/1986 | Shiomi et al. | 414/222 |
| 4,644,425 | 2/1987 | Tamaki | 360/69 |
| 4,653,794 | 3/1987 | Atlas | 294/88 |
| 4,655,674 | 4/1987 | Kohler | 414/735 |
| 4,664,590 | 5/1987 | Maekawa | 414/744 |
| 4,674,181 | 6/1987 | Hamada et al. | 29/703 |
| 4,674,893 | 6/1987 | Teramchi | 384/45 |
| 4,678,390 | 7/1987 | Bonneton | 414/282 |
| 4,683,987 | 8/1987 | Sakata et al. | 187/9 |
| 4,692,038 | 5/1988 | Kasai | 384/45 |
| 4,742,405 | 5/1988 | Teranishi | 360/92 |
| 4,749,327 | 6/1988 | Roda | 414/589 |
| 4,754,445 | 6/1988 | Young et al. | 369/37 |
| 4,768,428 | 9/1988 | Silvestrini et al. | 99/551 |
| 4,850,658 | 7/1989 | Sandor | 312/225 |
| 4,864,511 | 9/1989 | Moy et al. | 364/478 |
| 4,920,432 | 4/1990 | Eggers | 360/71 |
| 4,928,245 | 5/1990 | Moy et al. | 360/71 |
| 4,945,429 | 7/1990 | Munro et al. | 360/92 |
| 5,015,139 | 5/1991 | Baur | 414/281 |

FOREIGN PATENT DOCUMENTS 0045645 2/1982 European Pat. Off. .
0162248 11/1985 European Pat. Off. .

(List continued on next page.)

OTHER PUBLICATIONS (Mar. 16, 1988) Grau Lampertz brochure CeBIT'88, Hannover.

(List continued on next page.)

*Primary Examiner*—Harold Pitts
*Attorney, Agent, or Firm*—Nixon & Vanderhye

[57] ABSTRACT

A process is useful for operating an automatic data carrier archive associated as a memory with a computer. The data carriers are transported to and fro between various stations of the data carrier archive by a control device of the data carrier archive. The stations of the data carrier archive comprise at least one data carrier store and on write/read station for the data carriers. In order to improve the availability of the data carriers, each transport operation corresponds to at least one transport function, a priority is assigned to each transport function, transport functions with high priority are executed with low priority transport functions, and when the computer requests a data carrier in the write/read station, at least the immediate transport between the write/read station and another station is executed with a transport of highest priority.

42 Claims, 15 Drawing Sheets

FOREIGN PATENT DOCUMENTS

| Number | Date | Country |
|---|---|---|
| 0276967 | 8/1988 | European Pat. Off. |
| 0288165 | 10/1988 | European Pat. Off. |
| 1431675 | 3/1969 | Fed. Rep. of Germany |
| 2047386 | 4/1971 | Fed. Rep. of Germany |
| 7120189 | 5/1971 | Fed. Rep. of Germany |
| 2503505 | 8/1976 | Fed. Rep. of Germany |
| 2754176 | 6/1978 | Fed. Rep. of Germany |
| 2519870 | 7/1979 | Fed. Rep. of Germany |
| 2900194 | 7/1980 | Fed. Rep. of Germany |
| 3006205 | 8/1980 | Fed. Rep. of Germany |
| 2911615 | 10/1980 | Fed. Rep. of Germany |
| 3147285A1 | 6/1983 | Fed. Rep. of Germany |
| 3612531A1 | 11/1986 | Fed. Rep. of Germany |
| 8631725.3 | 3/1987 | Fed. Rep. of Germany |
| 3621790A1 | 1/1988 | Fed. Rep. of Germany |
| 2115764 | 7/1972 | France |
| 2610755 | 8/1988 | France |
| 146268 | 2/1981 | German Democratic Rep. |
| 159617 | 3/1983 | German Democratic Rep. |
| 60-61947 | 4/1985 | Japan |
| 60-118506 | 6/1985 | Japan |
| 61-158063 | 7/1986 | Japan |
| 61-170953 | 8/1986 | Japan |
| 62-16457 | 4/1987 | Japan |
| 581085 | 11/1977 | U.S.S.R. |
| 1172840 | 8/1985 | U.S.S.R. |
| 1587056 | 3/1981 | United Kingdom |

OTHER PUBLICATIONS (Dec. 16, 1987) Grau GmbH & Co. layout drawing.
(Nov. 27, 1987) Grau GmbH & Co. layout drawing.
(Aug. 1986) Bosch catalogue entitled "Flexible Automation and Handling Technology".
Patent Abstract of Japan, P-465, Jun. 7, 1986, vol. 10, No. 160.
(Oct., 1985) Bittler catalogue entitled "Bittler Modul Systeme".
(Jan., 1983) "Sensor Review", pp. 39-43.
(Mar., 1983) "Sensorausrustung und Regelung von Greifern fur Industrieroboter", VDI-Zeitschrift 125, No. 5, pp. 143-149.
(Mar., 1983) "Tape Cartridge Library System", IBM Technical Disclosure Bulletin, vol. 25, No. 10, pp. 5006-5007.
(Nov. 19, 1982) "A New Level of Automation in Work-in-Process Handling", reprinted from Modern Materials Handling, pp. 48-51.
(1978) "Greifer fur Industrieroboter", in the periodical Forden und Heben, 28, No. 1, pp. 40-43.
(Oct., 1973) "Cartridge Handling Systems", IBM Technical Disclosure Bulletin, vol. 16, No. 5, pp. 1584-1585.
Patent Abstract of Japan, vol. 10, No. 387 JP-A-6-1-175967.
"Fertigungssystem IBM 7575, Fertigungssystem IBM 7576", Feb. 1987.
Patent Abstract of JP 52-133726.
(Apr. 1979) SMPTE Journal, vol. 88, No. 4, pp. 221-223.
"Design of Real-Time Computer Systems" by James Martin, Prentice-Hall, Inc., 1967, pp. 44 and 45.

PROCESS AND DEVICE FOR OPERATING AN AUTOMATIC DATA CARRIER ARCHIVE

This is a continuation of application Ser. No. 07/573,186, filed Aug. 16, 1990, now abandoned.

The invention relates to a method for operating an automatic data carrier library associated with a computer as data store, with data carriers being transported back and forth between various stations of the data carrier library by transportation procedures of a handling device for the data carriers which are carried out by a control device of the data carrier library, with the stations of the data carrier library including at least one data carrier store and one read/write station for the data carriers.

Such data carrier libraries are known, in particular, from large computing centers where, for example, in data security rooms a large number of data carriers is held in readiness for the large-scale computer without the intervention of operating staff.

The transportation of the data carriers is carried out between the data carrier stores, comprised, for example, of rotary towers or shelves, and a read/write station, between the data carrier stores and the in/out storage station or the in/out storage station and the read/write station.

Data carriers are exchanged with the environment via the in/out storage station, i.e., for example, new or rerecordable data carriers, e.g., tape cassettes are held in readiness for recording new data material for use in the library. Data carriers from parallel libraries can be taken over via this station or so-called foreign data carriers originating from other computing centers made usable for one's own computing center via the in/out storage station and one's own library.

In the same way, the in/out storage station can be used to transfer cleaning devices, for example, cleaning cassettes for cleaning the read/write heads in the read/write stations.

In the computer-controlled data libraries known so far, the requests for the various transportation functions were processed in accordance with the time sequence of arrival of the requests, with a cleaning procedure being fitted in, where appropriate, between the transportation functions for maintenance of the read/write station.

Within the employment time of such a computer-controlled data library, there are always peaks of activity, in particular during the routine making of backup copies, at which time the data to be copied are not available for processing.

In order to avoid very long waiting times, either the handling capacity of data carriers per time unit in the tape library had to be increased by, for example, a further handling device being allocated to the same data carriers or the libraries were constructed at the beginning such that from the start a lower number of data carriers was allocated to a handling device. The latter procedure does, however, involve larger space requirements for the library.

Proceeding from this, the object of the present invention is to improve the availability of the data carriers.

This object is accomplished with the method described at the beginning in accordance with the invention in that each transportation procedure is carried out by at least one transportation function, that each transportation function is allocated a priority, that a transportation function with higher priority is carried out with precedence over a transportation function with lower priority, and that when the computer requests a data carrier in the read/write station, at least the direct transportation between the read/write station and a further one of the stations is carried out with a transportation function with highest priority.

Hence the inventive method has the great advantage that other less important transportation functions are postponed during the times when the computer requests a data carrier in a read/write station and, therefore, operation of the computer is not disturbed by the other considerably less important transportation functions, and these other transportation functions can be performed when there is no request for a data carrier from the computer.

In particular, provision is made in accordance with the invention for transportation functions which are to be performed by the data carrier library, but are not directly requested by the computer, to be allocated a lower priority. In this case, a direct request from the computer is preferably one where if it is not carried out, the computer would be unable to continue its program or only to a limited extent, thereby impairing the working capacity of the computer.

It is particularly advantageous for a first transportation function to be provided where transportation of one of the data carriers is carried out between the data carrier store and an intermediate store arranged within close access to the read/write station, for a low priority to be allocated to the first transportation function, for a second transportation function to be provided where transportation of one of the data carriers is carried out between the intermediate stores and the read/write station, for selected transportation procedures to be prepared or completed by the first transportation function before or after the request by the computer, and in the event of request of a selected transportation procedure by the computer, for only the second transportation function to be performed with highest priority.

Hence with this procedure there is the possibility of selecting individual transportation procedures which are then divided up into two transportation functions, with the preparatory or subsequent work by the first transportation function not having to be carried out simultaneously with the request by the computer and merely the second transportation function having to be performed immediately upon request by the computer. This makes it possible, for example, in the case of transportation procedures which occur often and, in particular, are known to the control device, to prepare these accordingly and hence via the intermediate store arranged within close access to the read/write station to create the precondition for the handling device not to have to cover any long paths upon receipt of a request for this data carrier from the computer and to, therefore, be able to insert the requested data carrier in the respective read/write station with as short gripping or transportation paths as possible. This saves considerable time and so the computer can continue working as freely as possible and the long transportation paths which would have had to be carried out by the handling device, for example, during the search for a data carrier in the data carrier store are eliminated so that the actual request can be processed. The long transportation paths can then be covered during those times at which there is no request for a data carrier from the computer.

In particular, provision is, therefore, expediently made for the selected transportation procedure to be a predictable procedure for transportation of a data carrier from or to the read/write station, for example, a transportation procedure away from the read/write station which firstly only requires clearance of the read/write station so that for further operation of the inventive data carrier library it is merely necessary for the data carrier to be transported from the read/write station to the intermediate store, and the following, hence predictable, transportation procedure to the end station in the data carrier store can be carried out subsequently without time limitation by a first transportation function. On the other hand, a predictable transportation procedure to the read/write station also exists when it is already known from other circumstances that such a data carrier will shortly be requested by the computer. In this case, with the first transportation function, the data carrier is firstly placed with foresight in the intermediate store without time limitation, and when the request is received from the computer, only transportation from the intermediate store to the read/write station is then necessary.

Within the scope of the inventive method, it is particularly expedient in the event a data carrier is located in a read/write station, prior to transportation of a further data carrier to this read/write station, for removal of the data carrier located therein to be carried out before transportation of the further data carrier. It is thereby ensured that owing to the priority allocation in accordance with the inventive method, an attempt is not made to insert a data carrier into a read/write station which is already occupied by a data carrier.

It is particularly advantageous within the scope of the inventive method for the removal of each data carrier to be carried out in the form of a selected transportation procedure.

Within the scope of the inventive method, it is also expedient for an in/out storage station to be provided as further station.

With provision of such a further station, it is similarly expedient, within the scope of the inventive method, for the transportation procedures involving the read/write station to be carried out in accordance with the transportation procedures relating to the data carrier store, i.e., that the same priority allocations be provided for the transportation functions as for the above described transportation between the data carrier store and the read/write station.

In the previous statements on the inventive method, the positioning of the intermediate store has not been discussed in further detail.

It is particularly expedient for the intermediate store to be defined as area within close access to the data carrier store.

Within the scope of the inventive solution, under the term within close access, arrangement of the intermediate store relative to the read/write station is always to be such that the handling device requires as short an access path as possible for transportation of the data carrier between the intermediate store and the read/write station, i.e., for example, arrangement adjacent to the read/write station.

Therefore, within the scope of the inventive method it is particularly expedient for the intermediate store to be arranged above the read/write station.

It is even more advantageous for the intermediate store to be moved along with the handling device as, in this case, the intermediate store is not only automatically placed within close access to the read/write station owing to the movement of the handling device, but also within close access to the respective position of access to the other stations, i.e., for example, to the data carrier store or the in/out storage stations.

Such an intermediate store moving along with the handling device also enables particularly advantageous design of handling devices wherein, for example, a large number of data carriers is to be transported from one station in the data carrier library to the other station. These can then all be loaded with short access times from the one station into the intermediate store and then after movement of the handling device transferred from the intermediate store to the other station or vice-versa.

It has proven particularly expedient within the scope of the inventive method for the intermediate store to be arranged within the gripping range of the handling device standing in a position of access to the read/write station.

In particular, provision is made within the scope of the inventive solution, preferably when large data carrier stores with a large number of rotary towers are used, for the handling device to be moved along a track extending along the side of the read/write station and the data carrier store, in order to carry out transportation procedures.

In the simplest case, provision is made for the handling device to be moved along the track in order to perform the first transportation function. In addition, provision is expediently made for the handling device to stop on the track in order to perform a second transportation function.

All of the above-described variants of the inventive method open up various advantageous new possibilities for use of a computer-controlled data carrier library. For example, various computers can have access to the data carrier library independently of one another, with different priorities being allocated to the transportation functions requested by each data processing system. This enables use of a common data file by various data processing systems without these requiring checking against one another. This checking is carried out in the control device for the data carrier handling device via the allocation of the priorities. It is similarly possible to differentiate between urgent and less urgent data carrier requests so the control device calls up the transportation functions in accordance with their priority and no longer in the order of precedence of the time sequence in which the requests arrive. With this method, particularly urgent data carrier requests can be treated preferentially while such requests for which the reaction times for making the data carrier available are not critical are carried out later.

Owing to the division of frequently required transportation procedures into times when the handling device is less active, it is possible for functions required later to be partly carried out by first transportation functions in an advance step so that in the case of a concrete request for such a function, only the second transportation function has to be carried out.

The time saving gained thereby considerably increases the availability of the data carriers (or shortens the reaction time of the library for a data carrier request), in particular, in times of peak activity of the handling device.

Allocation of one of the lowest priorities to the first transportation function results in a higher basic employment of the handling device, yet each concrete or current request for a data carrier is treated with precedence.

Particularly advantageous possibilities for the organization of the automatic data library itself are likewise opened up by the inventive method for operating the data library. It is thereby made possible for the control device to select the transportation function with lowest priority, if required, at regular time intervals, and even continuous operation of the transportation function with lowest priority can, if required, be maintained. If requests for transportation functions with higher priority are received, the continuous operation of the transportation function with the lowest or generally with a lower priority is then interrupted and only resumed when all requests for transportation functions of higher priority have been dealt with.

This procedure is suitable, in particular, for transporting empty or rerecordable data carriers delivered to the automatic data carrier library via the in/out storage station to a storage area directly adjacent to the read/write station. In this way, the transportation procedure during the data backup processing phase which regularly involves peak activity of the handling device and the data library is prepared and shortened. The entire data backup processing phase is thereby shortened and more comprehensive data backup processing measures are possible with the same transportation capacities within the same period of time. After the data carrier has been transferred from the in/out storage station to the vicinity of the read/write station with the first transportation function, in the data backup processing phase it then only has to be transported a short distance to the read/write station with the second transportation function. In particularly expedient cases, the handling device may remain in one position for performance of the second transportation function while all necessary movements are carried out by a gripper arm.

In conventional data carrier libraries, the time for making available a recordable data carrier may, for example, be reduced from approximately 15 to 20 seconds to 6 to 8 seconds.

A further possibility for improving the time behavior of the data carrier library consists in a test run with which the availability of individual data carriers is verified being defined as function with lowest priority. This may involve a check and comparison of the designation on the data carrier cover with the identification on the data carrier material itself or a check as to whether the individual data carrier is present in the data carrier store in the storage position stored in the control device.

In the same way, a resorting in the data carrier library whereby the data carrier storage areas located adjacent to the read/write stations are occupied by the data carriers required most often can be defined as transportation function with lowest priority.

It is, furthermore, advantageous within the scope of the inventive method for insertion of a cleaning data carrier to be performed with a transportation function whose priority is lower than the highest priority so the insertion of the cleaning data carriers, which is likewise necessary after predetermined time intervals, also has to be carried out after the transportation functions of the highest priority in the order of precedence and hence no longer in a strict time sequence. To this end, the usages of the individual read/write stations are preferably registered and when a predetermined number of usages has been reached, the transportation function relating to the cleaning data carrier is called up and processed in accordance with its priority.

Such transportation functions within the data library can be integrated into the normal continuous operation of the data carrier library without any less of reaction time and so a maximum availability of the data carriers with shortest reaction time can always be ensured.

In a particularly preferred method, in addition to the function with the lowest priority, a further function with the next highest priority is provided for continuous operation according to requirement. In this case, the function with the lowest priority replaces the function with the second lowest priority when there is no requirement—temporarily—for the function with the second lowest priority.

Alternatively or additionally, it is possible to change the allocation of the priorities to the individual functions during operation of the library. The availability of individual data carrier types can, for example, thereby be adapted to the request profile during the operating time of the computer.

In particular, the change in the allocation of the priorities can be brought about in accordance with the invention by a predetermined time pulse or be made dependent on the occurrence of a certain event.

The intermediate storage of data carriers is, however, not only limited to the area of the data carrier store defined separately as intermediate store or to a correspondingly defined area arranged in the vicinity of the read/write station. On the contrary, in the event of overloading of this area, further parts of the data carrier store can be used for this purpose and so, for example, data carriers to be recorded can be taken over from the in/out storage station into a further part of the store and only transferred to the area adjacent to the read/write station when a storage position has become free there.

Similarly, the transportation function with which a data carrier is to be transported from the read/write station directly to the in/out storage station can be divided into two transportation functions. In this case, the second transportation function of higher priority involves the removal of the data carrier from the read/write station (maximizing the available capacities here, too!) and the temporary storing of the data carrier in the intermediate store or an area of the data carrier store defined as such. The first transportation function with low priority then transports the data carrier to the in/out storage station once a storage position becomes free there and/or once there is no request for a transportation function with higher priority.

During continuous operation, in particular in the sorting of the priorities and the division of several functions into two transportation functions, a "queue" may form for transportation functions with lower priority which is then processed when no requests for transportation functions with higher priority are received. Transportation functions with identical priority are preferably lined one behind the other in accordance with their time sequence.

It is, of course, possible to limit the length of the "queue" and when this limit is reached, to change the priorities of the transportation functions—temporarily—so as to exclude failure to carry out the transportation functions with low priority over longer periods of time and overloading of the storage areas defined as intermediate stores.

In a preferred method, prior to removal from the data carrier store or also from the in/out storage station, the data carriers to be transported are identified via a mark which can be sensed from outside. In the event of wrongly sorted data carriers in the data store or in the in/out storage station, this procedure avoids unnecessary transportation of the data carrier, for example, to the read/write station where similarly only the lack of identity with the requested data carrier could be ascertained.

Optical and/or magnetic identification carriers are preferably used as marks. The optical identifications are preferably in the form of a bar code applied to the data carrier, preferably its cover. The handling device, in particular the gripper of the handling device, is equipped with a corresponding sensing device or reading device.

In this case, provision may be additionally made for the handling device to determine the exact position of the data carrier prior to removal of the data carriers from the respective stations, in particular from the data carrier store. This may, for example, be carried out by the exact position of an adjustment or orientation mark on the data carrier being detected and self-adjustment of the handling device being thereby effected. This ensures that the data carrier can be gripped and transported by the handling device in such a way that the data carrier is always in a defined position in relation to the handling device. This avoids undefined insertion of the data carriers into both the stores and the read/write devices or loss of an inadequately gripped data carrier during the transportation.

In particular in connection with equipping the data carriers with marks which can be sensed from outside, it is recommendable, as supplementation thereto, after insertion of the data carrier in the read/write station, to first determine and compare an identification applied to the data carrier itself with the identification ascertained by the handling device. This similarly serves to check whether the mark on the data carrier is correct. Since the marks are usually applied to the data carrier cover by hand, there are possibilities of errors here which in accordance with the inventive method can be detected during the first use of the data carrier.

The data carriers where a different identification is ascertained on the mark and on the data carrier are either sorted out and filed separately or returned to the store and barred from further use. It is also conceivable to separate and transport the data carrier to a station where the correct designation is applied.

For accurate access to the data carriers in the data carrier library, it is necessary for the corresponding positions of the data carriers to be stored in the storage area of the computer and/or of the control device. This position storing, also referred to as library directory, increases the reliability of access to a data carrier, in particular in the case of redundant keeping of the library directory.

Although the transportation functions of the handling device are preferably called up and selected fully automatically by a computer, provision may be made for the transportation functions to be additionally or alternatively selectable by operating staff. The operating staff then transfers the control commands directly to the control device via a console. This has the advantage that even in the event of interruption of the connection between the computer and the control device, operation of the automatic data library is possible, with the selection lists being sent from the computer to the operator who then passes on the transportation functions via the console to the control device.

With this procedure, it is, above all, recommendable for the positions of the data carriers in the store of the control device and the requesting computer to be updated separately, even if acknowledgement cannot be sent from the control device to the computer. With this procedure, after the connection between computer and control device has been reestablished, a comparison of the data carrier positions (library directory) stored in the control device and the computer can then be additionally carried out and, if appropriate, a request list for transportation functions compiled by the computer and the identity between the data carrier positions stored in the control device and the computer reestablished in the course of the processing thereof.

The above-explained three method components within a method for operating an automatic data carrier library, namely
(a) the operating of the data carrier library via transportation functions with different priority,
(b) the checking of the data carrier identity and
(c) the redundant keeping of the library directory and the possibility of operating the data carrier library independently of the direct connection between computer and control device, for example, by operating staff are each in themselves methods for which protection is claimed independently of one another.

In the combination of the individual method components, however, an excellent error tolerance of the entire method is achieved. This makes 24-hour, non-operator operation possible and, in addition, even in the event of failure of the direct connection between computer and control device, permits further maintenance of operation of the data carrier library, where appropriate, by operating staff and, if desired, after reestablishment of the direct connection between computer and control device, automatic comparison between the redundant library directory kept in the computer and in the control device.

A further object of the invention is to so develop an automatic data carrier library that, in particular, it is suited for performance of one of the above-described methods.

The known automatic data carrier libraries comprise in addition to the data carrier store and the read/write device communicating with the computer, a handling device which selects from the large number of data carriers present in the data carrier library the requested individual data carrier and places it in the read/write device for processing. In order to keep the data files in the data carrier library variable and flexible, and, in particular, to enable the entire data carrier library to be accommodated in a closed-off room, as is also customary for the central computer, with simultaneous guarantee of a maximum of availability, data security and data privacy, an in/out storage station is provided to connect the spatially closed-off data carrier library with the outside world. Via the in/out storage station, data carriers can be exchanged with the environment and unrecorded or rerecordable data carriers can be let into the data carrier library for recordal of new data. For maintenance of the read/write devices, it is similarly necessary for cleaning devices in the form of a data carrier, for example, in the case of use of data tape cassettes, so-called cleaning cassettes, also referred to as cleaning data carriers, to be let into the data carrier library so the read/write devices can be subjected to a cleaning cycle at regular intervals.

As described previously, the employment to capacity of a data carrier library and the employment to capacity of the handling device for transporting the data carriers within the data carrier library are subject to large variations with time. Substantially full employment of the transportation capacity within the data carrier library is regularly achieved at times when the routine data backup processing of the data processing system is being carried out. Since at this time the user does not have access to a large part of the data otherwise available and hence use of the data processing system is only possible with limitations, if at all, it is desirable to keep this period of time as short as possible.

Since new or rerecordable data carriers usually have to be let in from outside via the in/out storage station for the data backup processing, the transportation functions for bringing about transportation between the in/out storage station and the read/write stations are more frequent at these times.

During the remaining operation time of the data carrier library as quick access as possible to the data carriers kept in storage and the data files kept thereon is of paramount interest and it is, therefore, necessary for the data carrier stores to be arranged within the proximity of the read/write devices so as to enable as short transportation paths as possible for the data carriers which have already been recorded.

For this reason, the in/out storage station within the data carrier library is arranged by way of necessity at a more remote location from the read/write devices.

Proceeding from this situation, the object underlying the present invention is to enable quick availability also of the data carriers required for the data backup processing.

This object is accomplished in accordance with the invention in an automatic data carrier library of the previously described kind by an intermediate store for data carriers being arranged adjacent to or within close access to the read/write station.

This intermediate store is preferably arranged directly beside or above the insertion openings for the data carriers in the read/write station. These intermediate stores are occupied, in particular, by unrecorded or rerecordable data carriers which are let into the data carrier library via the in/out storage station.

In special cases, this intermediate store may, however, also be used for depositing data carriers which on a statistical average are requested by the computer considerably more often than other data carriers.

For the organization of the data carrier library, this brings the advantage that data carriers for which there is a standard requirement at times of high employment of the handling device in the data carrier library can be transferred to the direct proximity of the read/write stations at times of lower employment, for example, the data carriers to be freshly recorded or rerecorded referred to previously. This shortens the transportation time of the data carriers required most often at peak times from the hitherto customary 15 to 20 seconds to only 6 to 8 seconds and, therefore, with a library of identical size, for example, the time required for the backup processing can be substantially reduced or a backup of more voluminous data files can be made on data carriers within a constant period of time for the data backup processing.

The normal operation of the data carrier library is in no way influenced by the use of the inventive method as the transportation of the recordable data carriers from the in/out storage station to the intermediate store can be allocated the lowest priority so this transportation function can be interrupted by the request for a transportation with higher priority, for example, by the request for a data carrier from the data carrier store for the read/write station or the request for its transportation back to the data carrier store.

In principle, the area located next to the read/write station or the areas located near to it could also be defined as intermediate stores for rerecordable data carriers which have been let in, for performance of the inventive method, however, narrow spatial limits are set here and, therefore, with this solution the capacity of such an intermediate store would be very limited. Also, in the event of use of rotary towers for construction of the data carrier store, it cannot be guaranteed that the rotary tower storage areas available in this case for recordable data carriers are always in a position accessible to the handling device if operation of the rotary tower in the making available of other data carriers, too, is not to be limited.

Moreover, in the majority of cases, a longer transportation time will still prove necessary as the arrangement of the data carrier shelves and likewise the rotary towers used must also be governed by the criterion of good space exploitation. The arrangement of an additional intermediate store for data carriers adjacent to the read/write station does, however, permit alignment of the intermediate store and the data carriers to be positioned therein with the in/out openings of the read/write devices and optimal arrangement in relation to the insertion openings of the read/write devices.

This special alignment of the intermediate store positions of the data carriers with the in/out openings of the read/write stations does, however, offer a further time advantage for the transportation of the data carriers requested most often within a short period of time, typically the recordable data carrier for the data backup processing.

The data carriers are preferably positionable in the intermediate store such that they assume therein a position which is substantially parallel to that in the read/write device. Hence the movement of the data carriers during transportation from the intermediate store to the read/write device can be reduced to a minimum, in particular, rotary motion of the handling device is eliminated.

It is particularly expedient in the inventive data carrier library for the handling device to be movable along a track.

The track is expediently placed so as to extend along the read/write station and along the data carrier store.

Furthermore, an in/out storage station is preferably provided in addition.

A particularly expedient arrangement is achieved by the in/out storage station being arranged at one end of the track.

The arrangement of the intermediate store has not yet been discussed in detail. It has proven particularly expedient for the intermediate store to be arranged so as to travel along on the handling device as, in this case, the intermediate store is not only always within close access to the handling device and the read/write station when the handling device wants to insert a data carrier in this station but also within close access to the handling device when the latter wants to grip a data carrier from a position in the data carrier store or in an in/out storage station or insert it therein.

The arrangement of the inventive intermediate store for close access is particularly expedient when the intermediate store is arranged within the gripping range of the handling device standing in a position with access to the read/write station.

In a further preferred arrangement of the inventive intermediate store, provision is made for the latter to be arranged above the read/write station.

A robot with seven degrees of freedom of movement is expediently chosen as handling device, with one degree of freedom constituting a travel movement within the library and three degrees of freedom being available for rotary movements.

Automatic data carrier libraries which are operated with the inventive method presented hereinabove can be hermetically sealed off from the environment during operation. In particular, it is possible for the data carrier exchange with the outside world to be carried out solely via the in/out storage station and for operating staff to be granted admission for maintenance work only. This is possible, in particular, in view of the high error tolerance of the method presented hereinabove and so an optimum availability of the administered data with simultaneous data security and data privacy is possible. In particular, substantial isolation of the rooms serving to accommodate the data carrier library and excellent admission control are possible. In particular, the inventive automatic data carrier library can be accommodated in special data security rooms which, for example, provide protection against magnetic radiation, screening protection against the radiation of electromagnetic waves or against electromagnetic pulses.

The control device required for the handling device may either be a part of the central computer or part of the actual data carrier library. Standard microcomputers or programmable control systems which are integratable into the handling device itself and are equipped with a storage area for storing the data carrier positions in the data carrier store, i.e., for storing and updating the library directory, are, for example, suitable for this purpose.

The following graduation of the priorities of the transportation functions is, for example, suitable for operation of such an automatic data carrier library:

(a) Transportation Functions With Highest Priority

So-called volume mounts or volume keeps where a data carrier is removed from the data carrier store of the data carrier library and transported by the handling device to the read/write station or is removed from the read/write station and returned to the place provided for it in the data carrier store. Parallel or alternatively to this, a so-called scratch mount can be allocated the highest priority. Here a recordable data carrier is brought either from the intermediate store or from the in/out storage station to the reading device or a freshly recorded data carrier is brought to an empty position in the data carrier store.

(b) Transportation Functions With Higher Priority

So-called mounts or keeps of cleaning data carriers which in accordance with a predetermined number of volume or scratch mounts, possibly with a certain tolerance with respect to the number of procedures, are inserted in the read/write devices for maintenance of the read/write heads of the devices.

In this connection, it is important that records be kept on use of the cleaning data carriers designed for multiple use and that these be automatically set aside after a maximum number of cleaning cycles.

(c) Comparable, i.e., Higher Priority is allocated to so-called foreign data carriers which are made temporarily available by other computing centers or computers and data carrier libraries and which are not integrated into the data carrier library. These data carriers are removed from a predefined area of the in/out storage station and brought to the read/write station. After use of the foreign data carriers, these are returned to the in/out storage station.

(d) The Lowest Priority is allocated to the transportation function of so-called scratch data carriers from the in/out storage station to the intermediate store. This transportation function can, however, be declared a continuous or basic function until the intermediate store is adequately supplied with the scratch data carriers.

It is, furthermore, conceivable for a reorganization of the data carrier library to be carried out as additional basic function, with, for example, the data carriers requested most often being deposited in the positions of the data carrier stores located closest to the read/write devices.

Aside from the method aspects referred to at the beginning as essential to the invention, the above-mentioned apparatus aspects are also essential to the invention and, therefore, protection is also sought for these individually and in their entirety.

Figure 2:
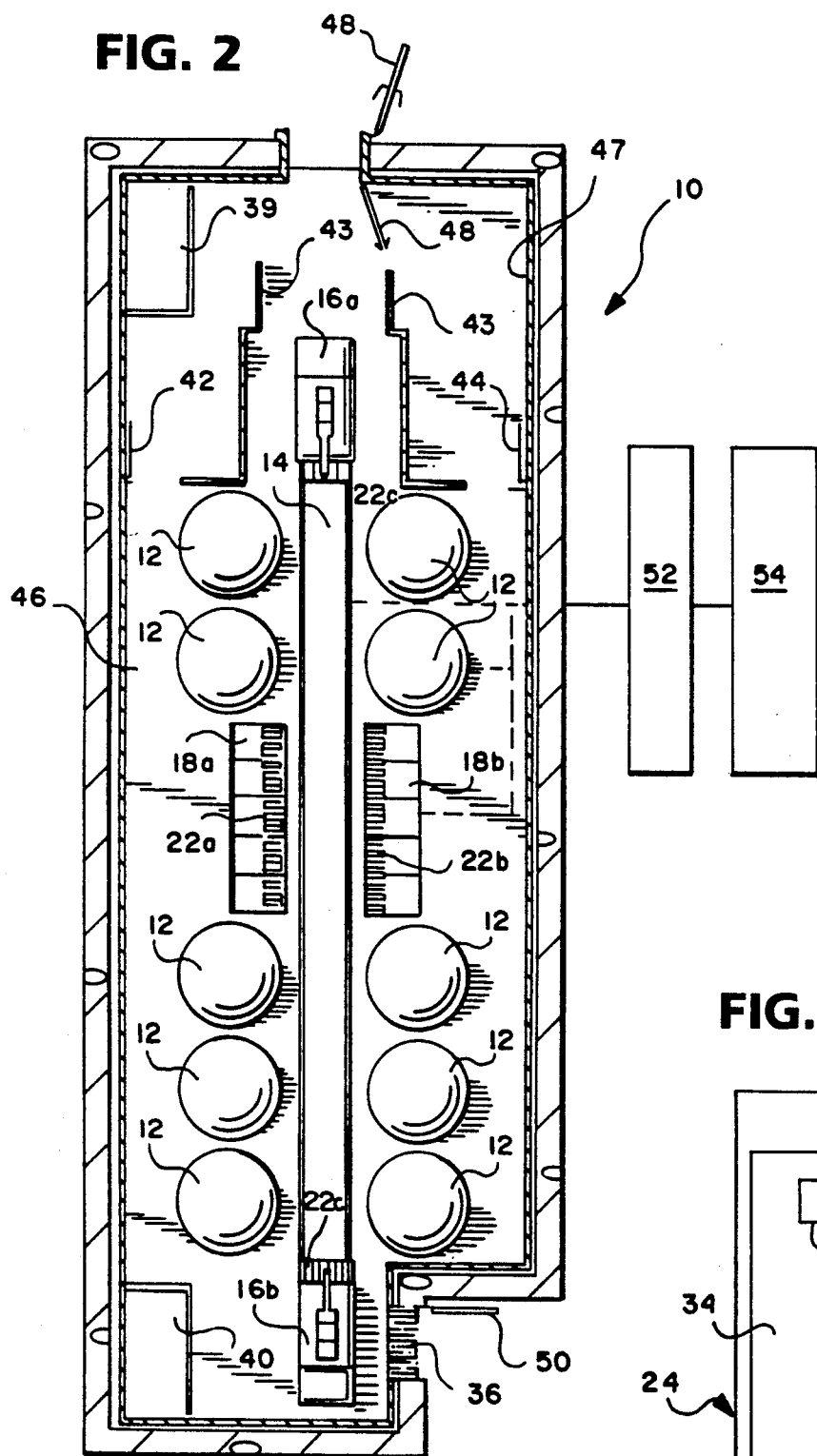
Figure 3:
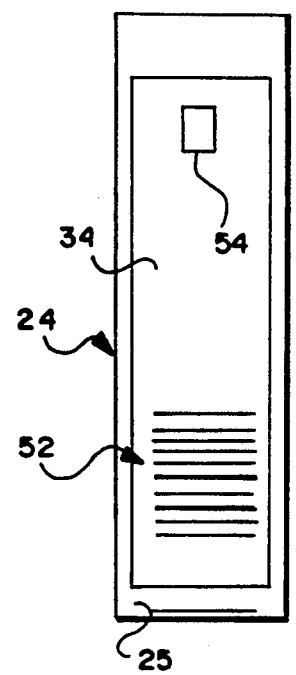
Figure 4A:
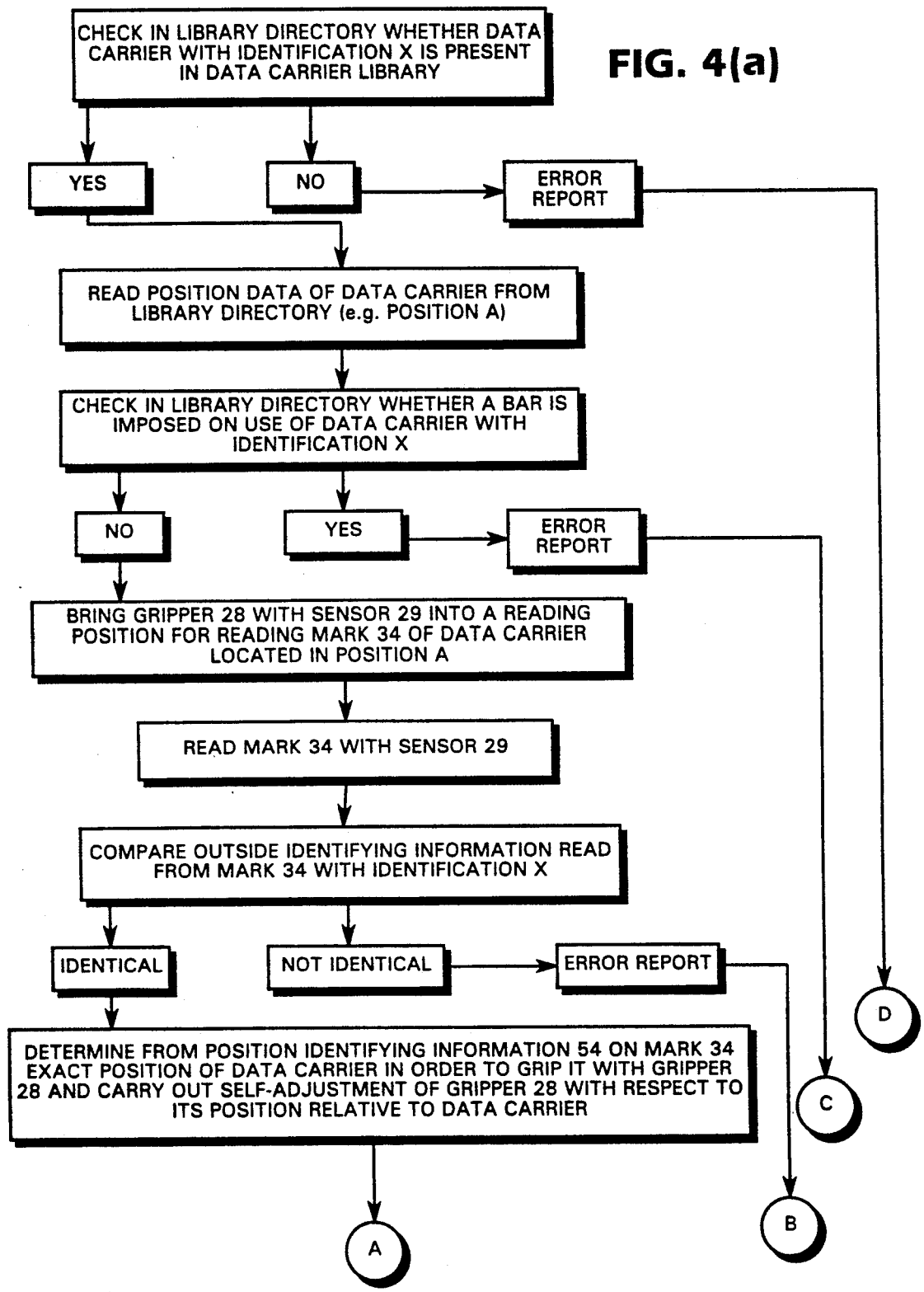
Figure 4B:
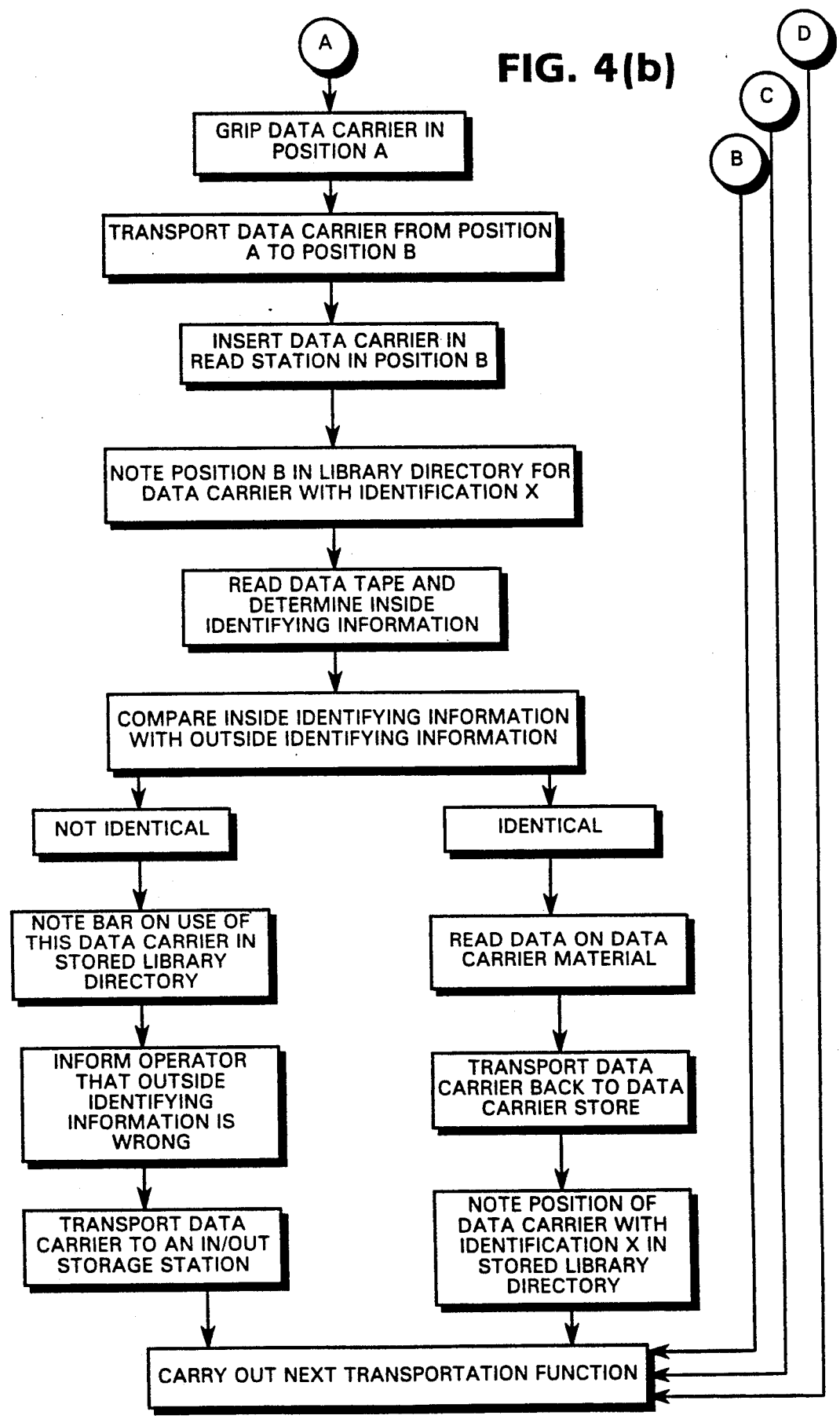
Figure 5:
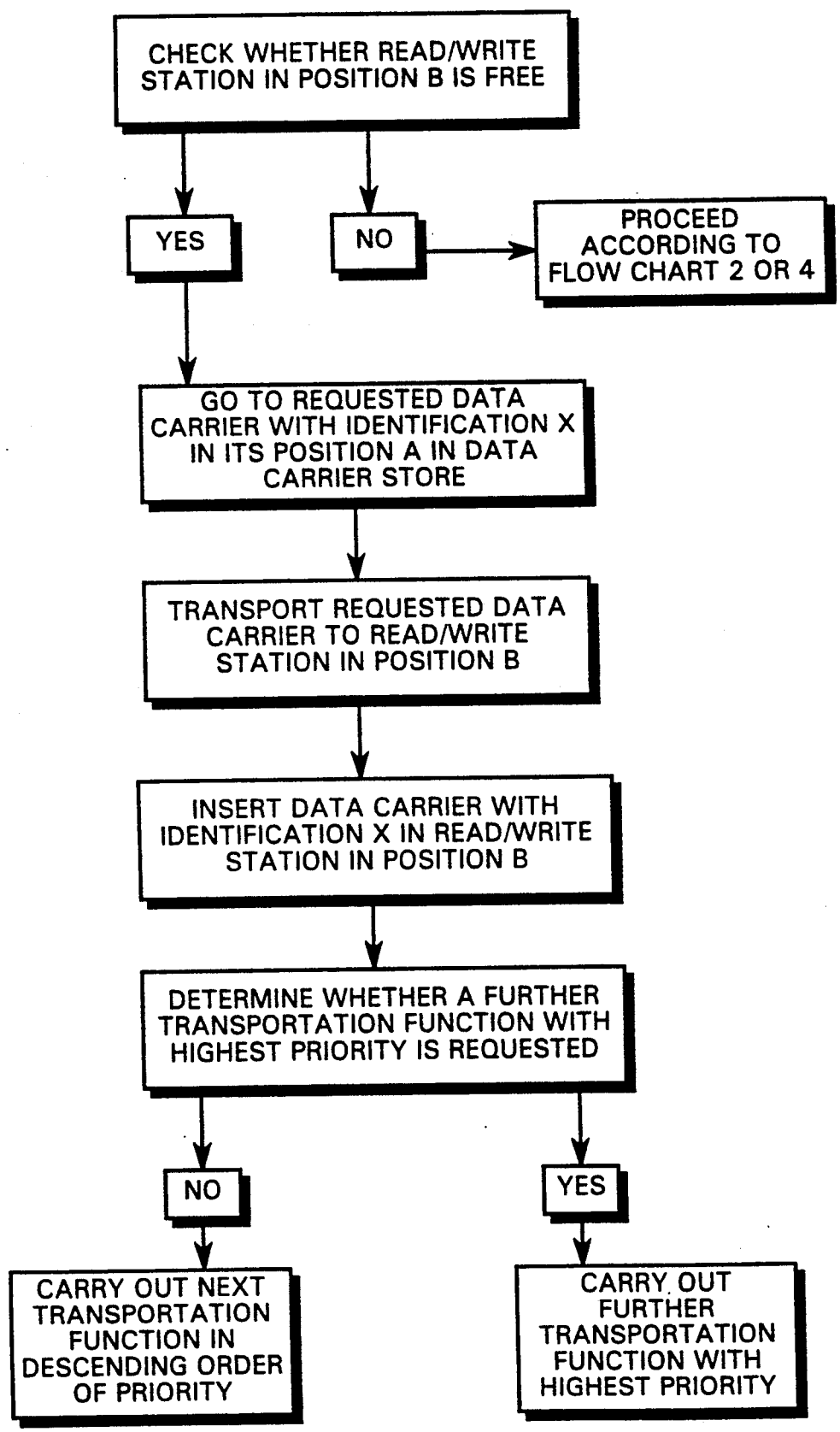
Figure 6:
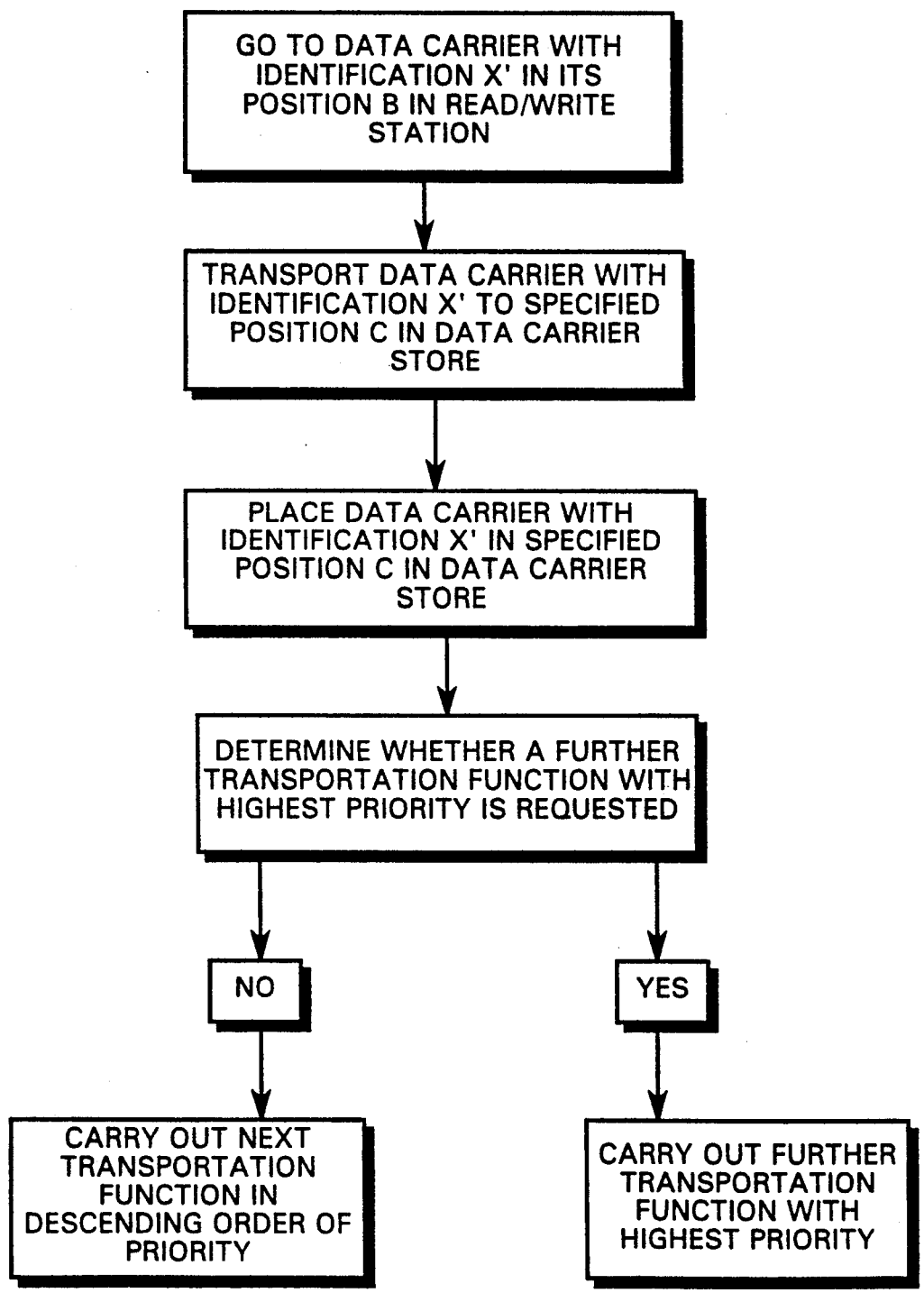
Figure 7:
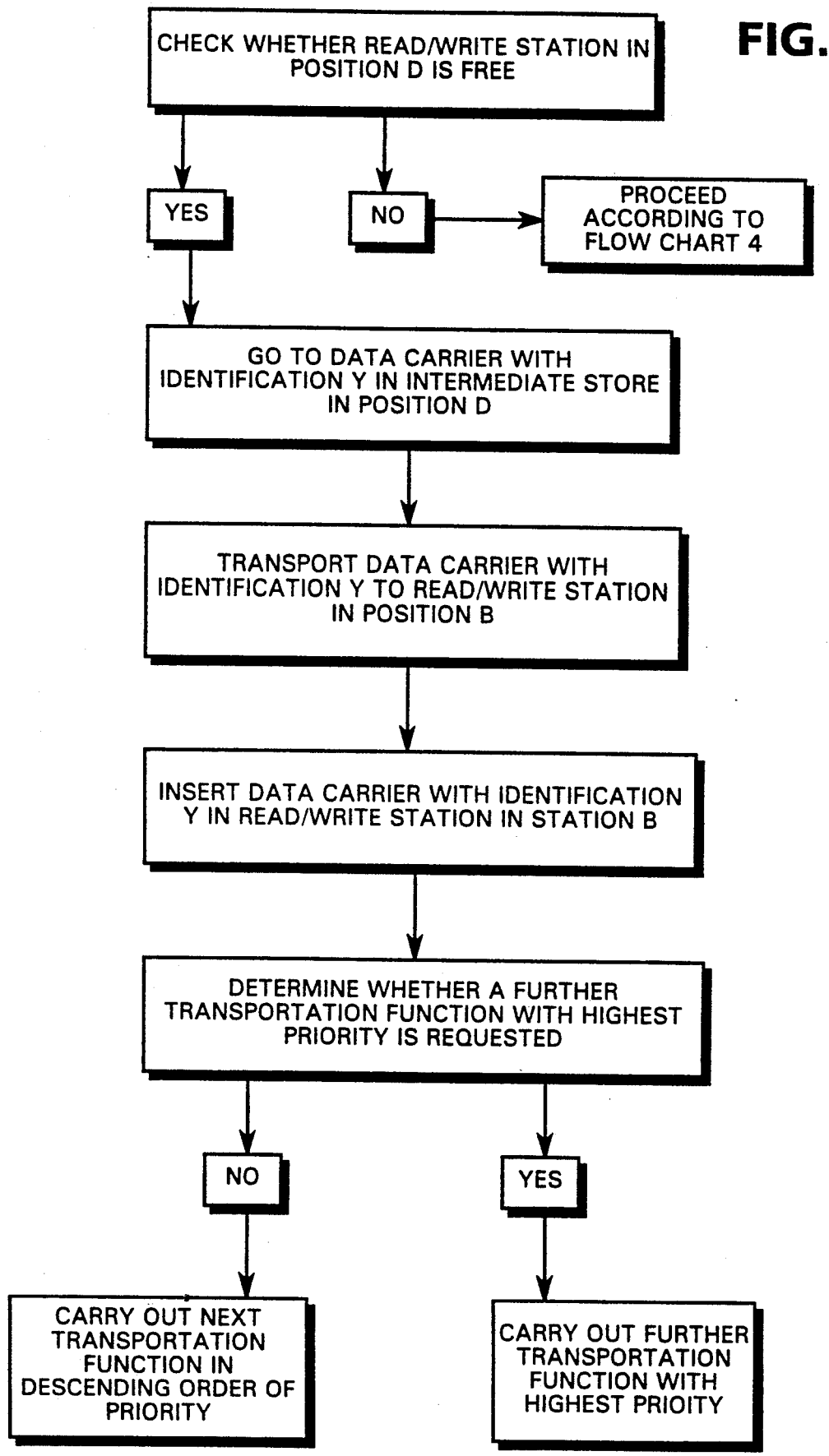
Figure 8:
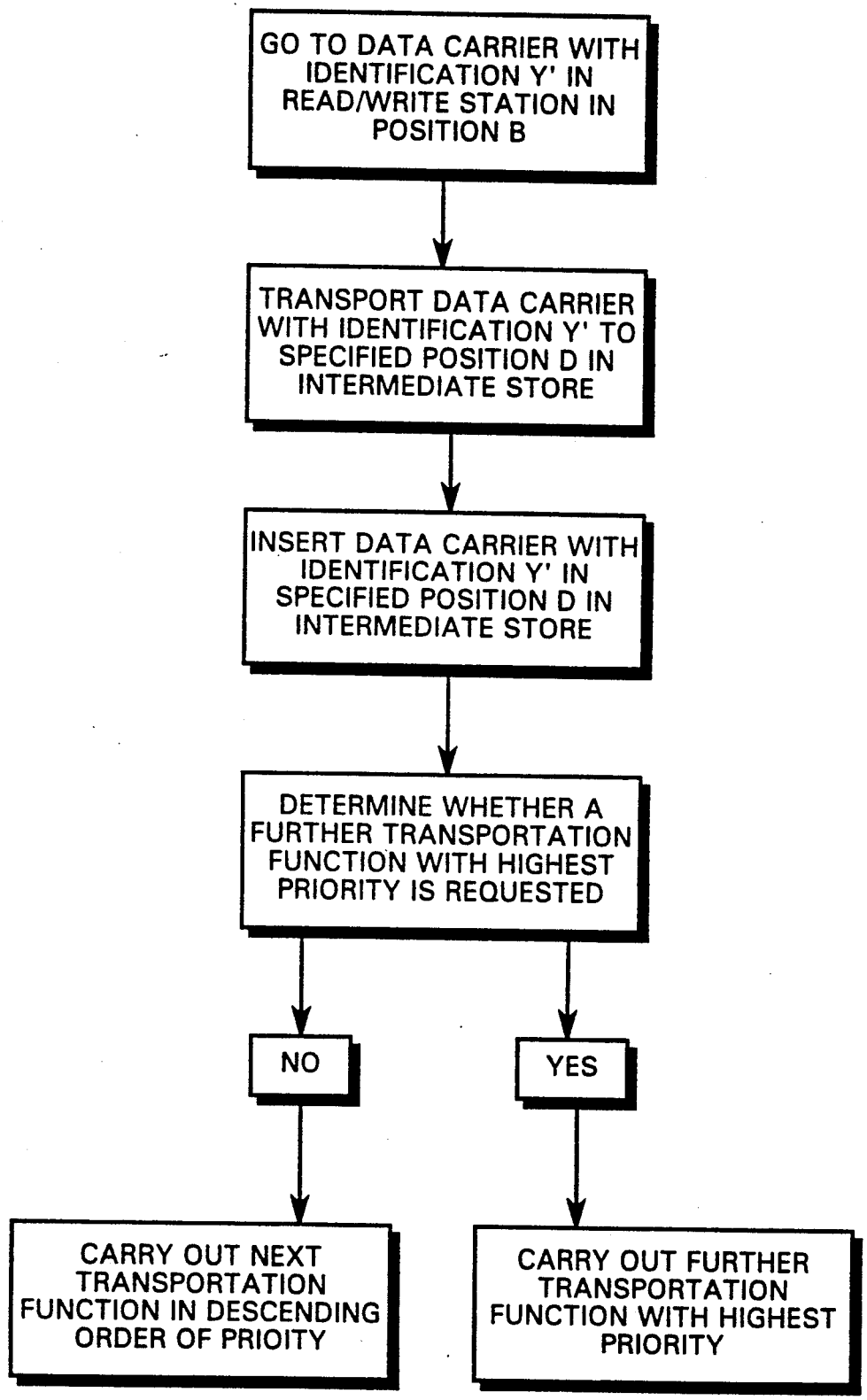
Figure 9:
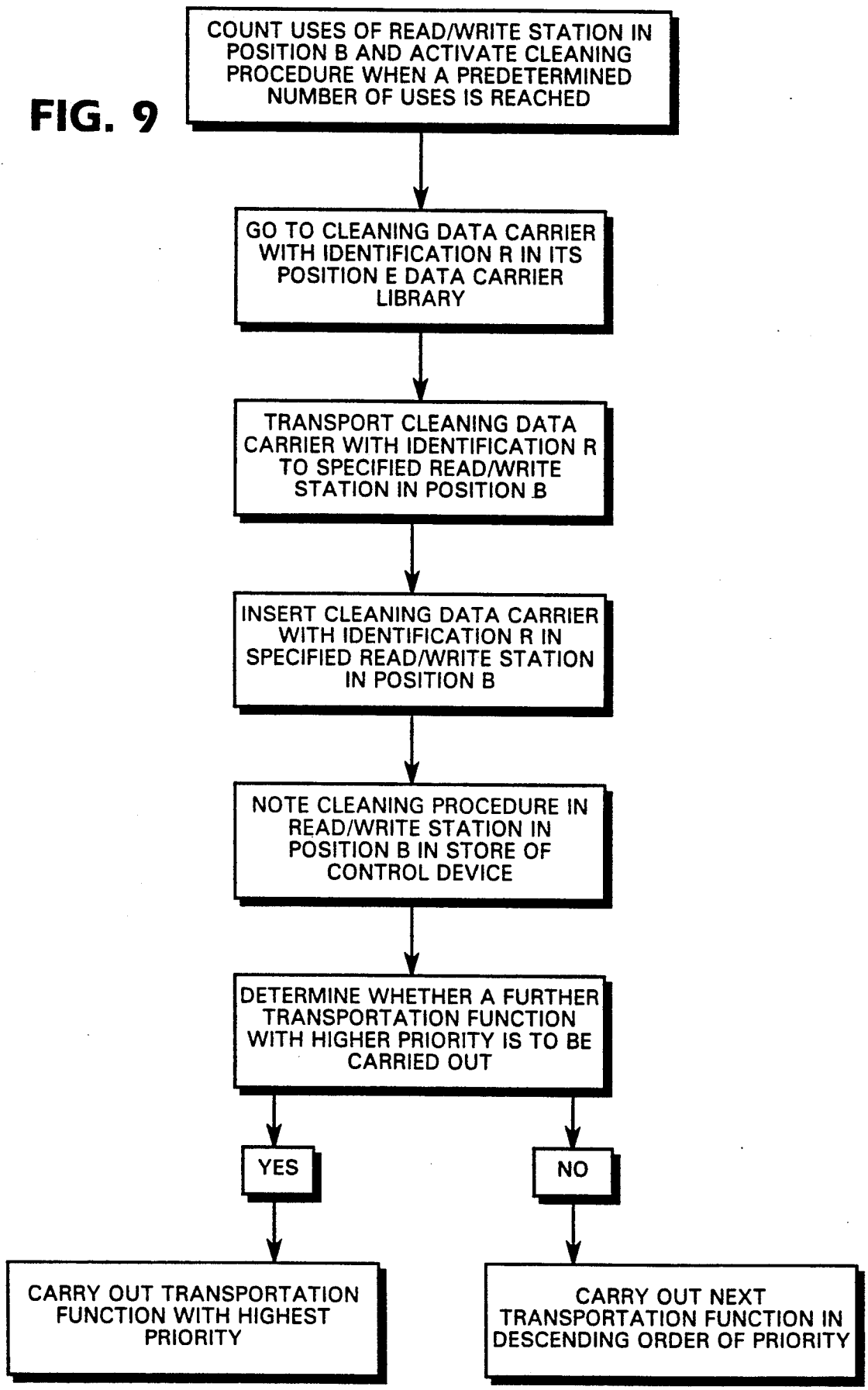
Figure 10:
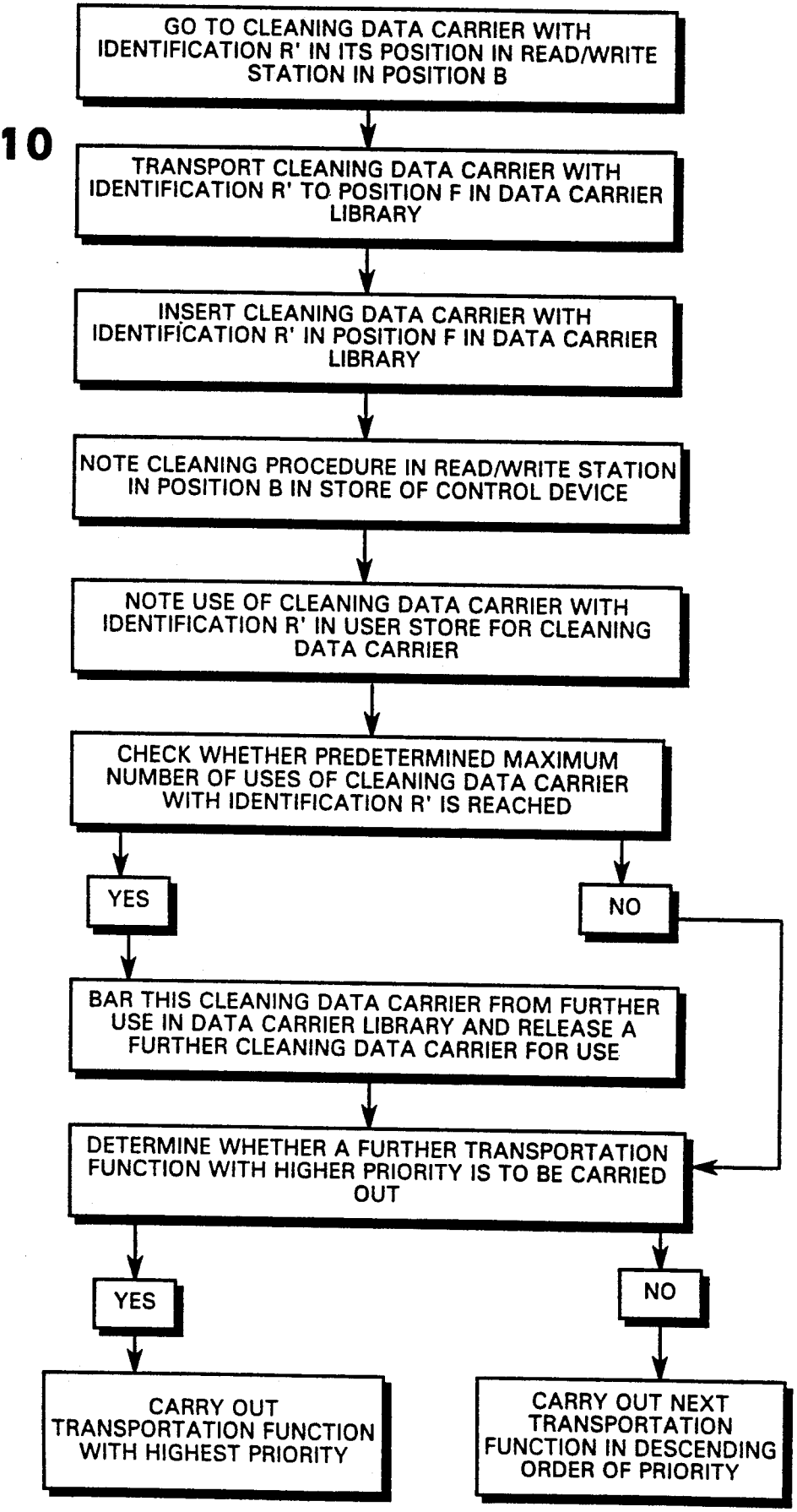
Figure 11:
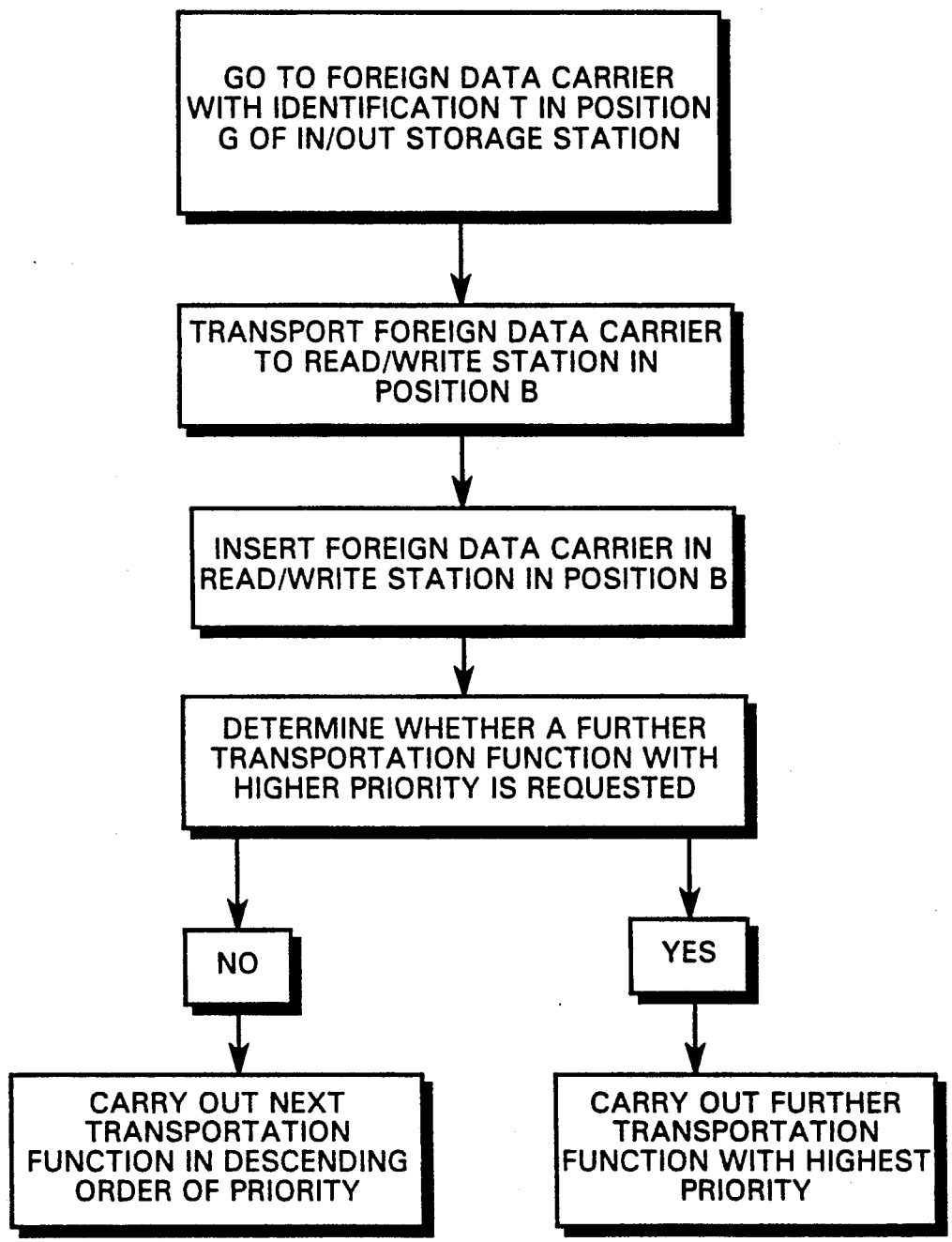
Figure 12:
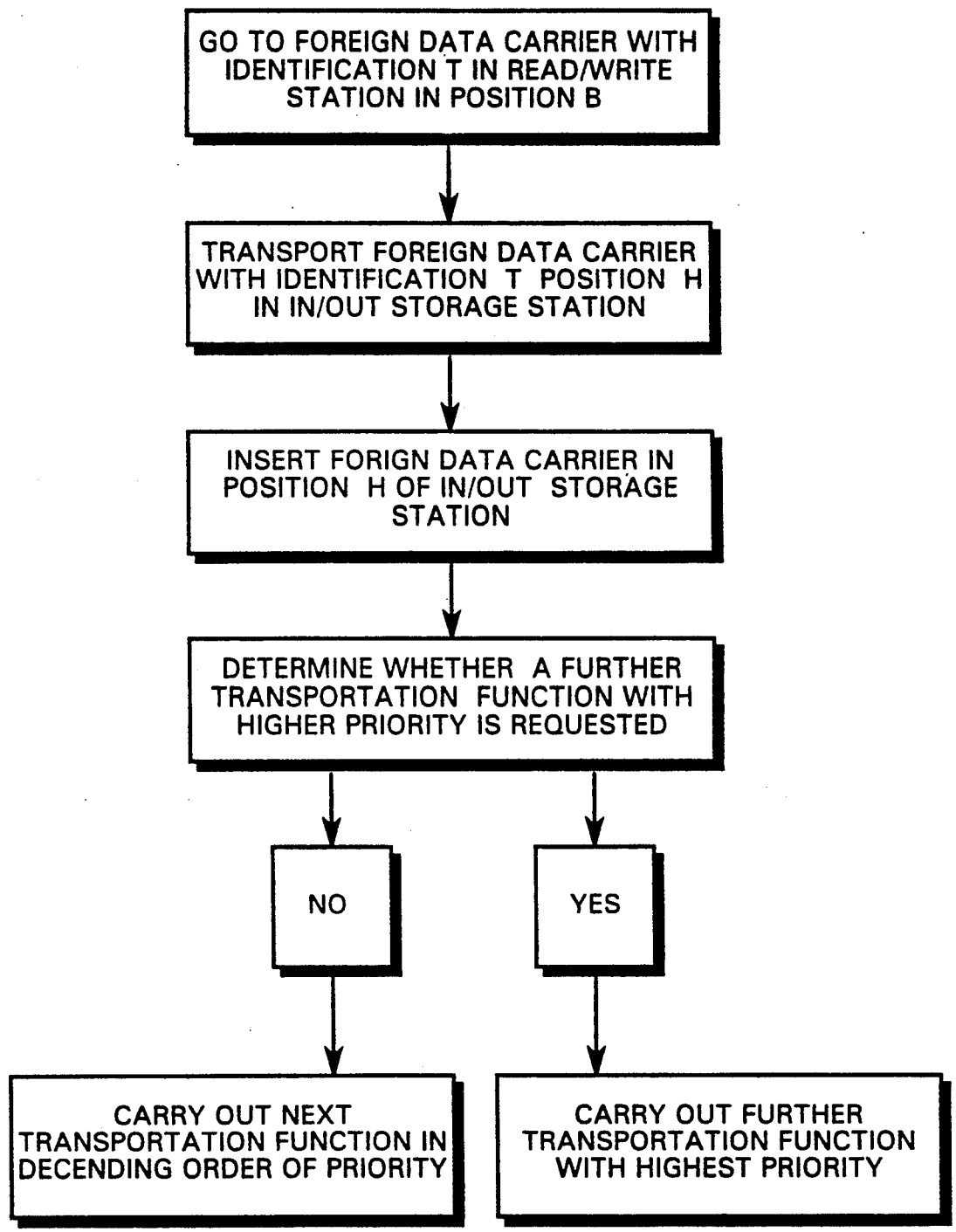
Figure 13:
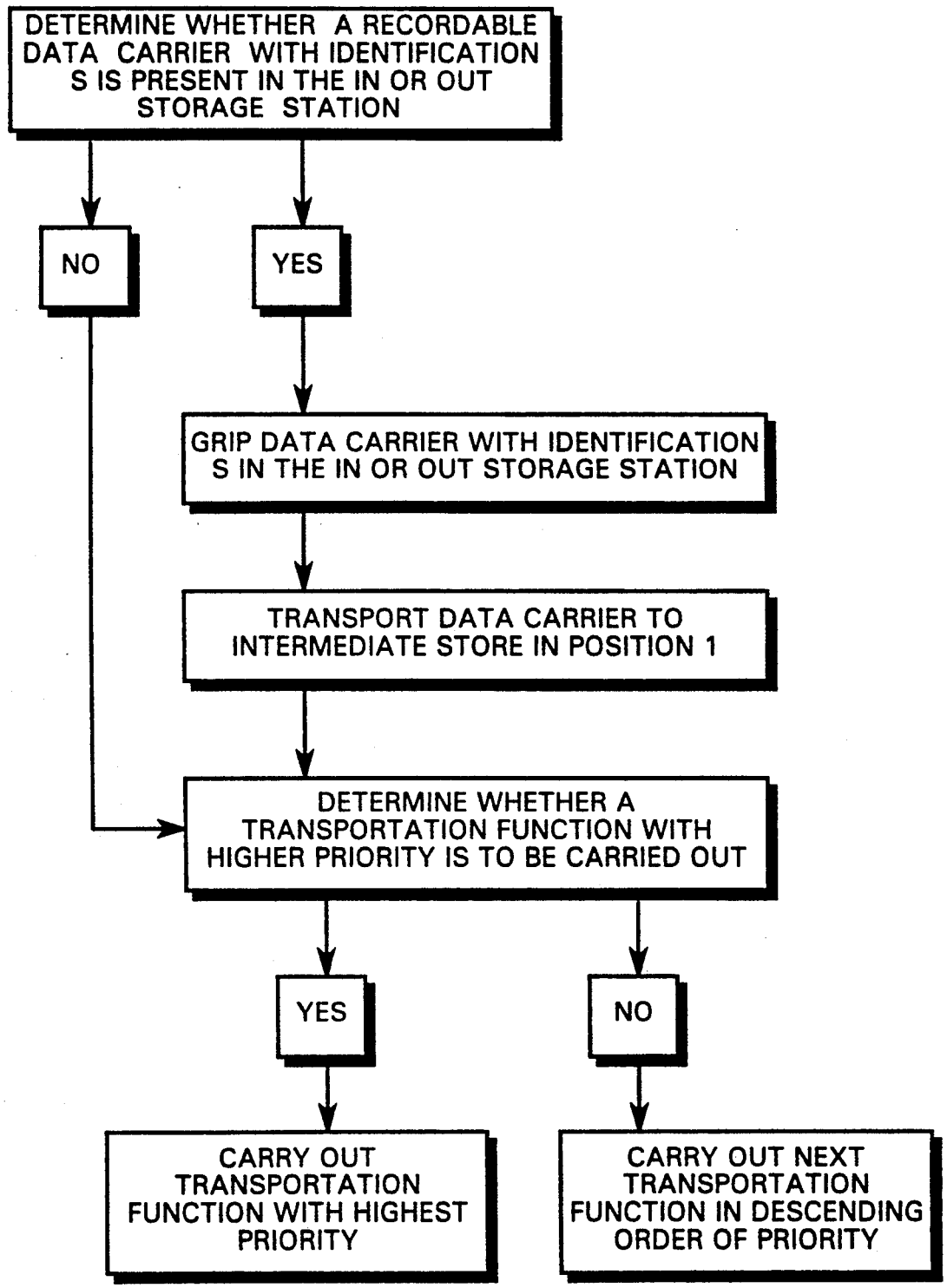
Figure 14:
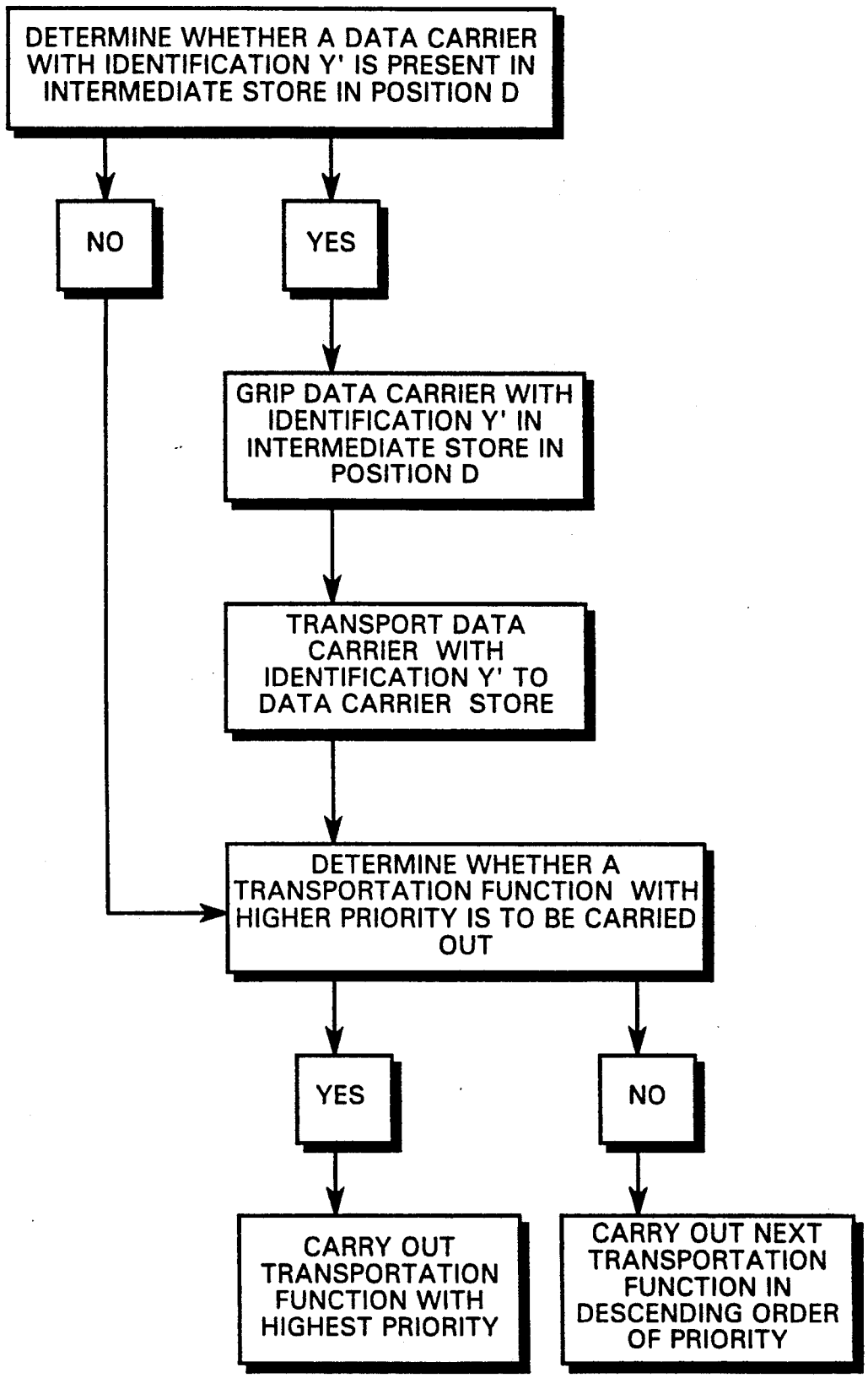
Figure 15:
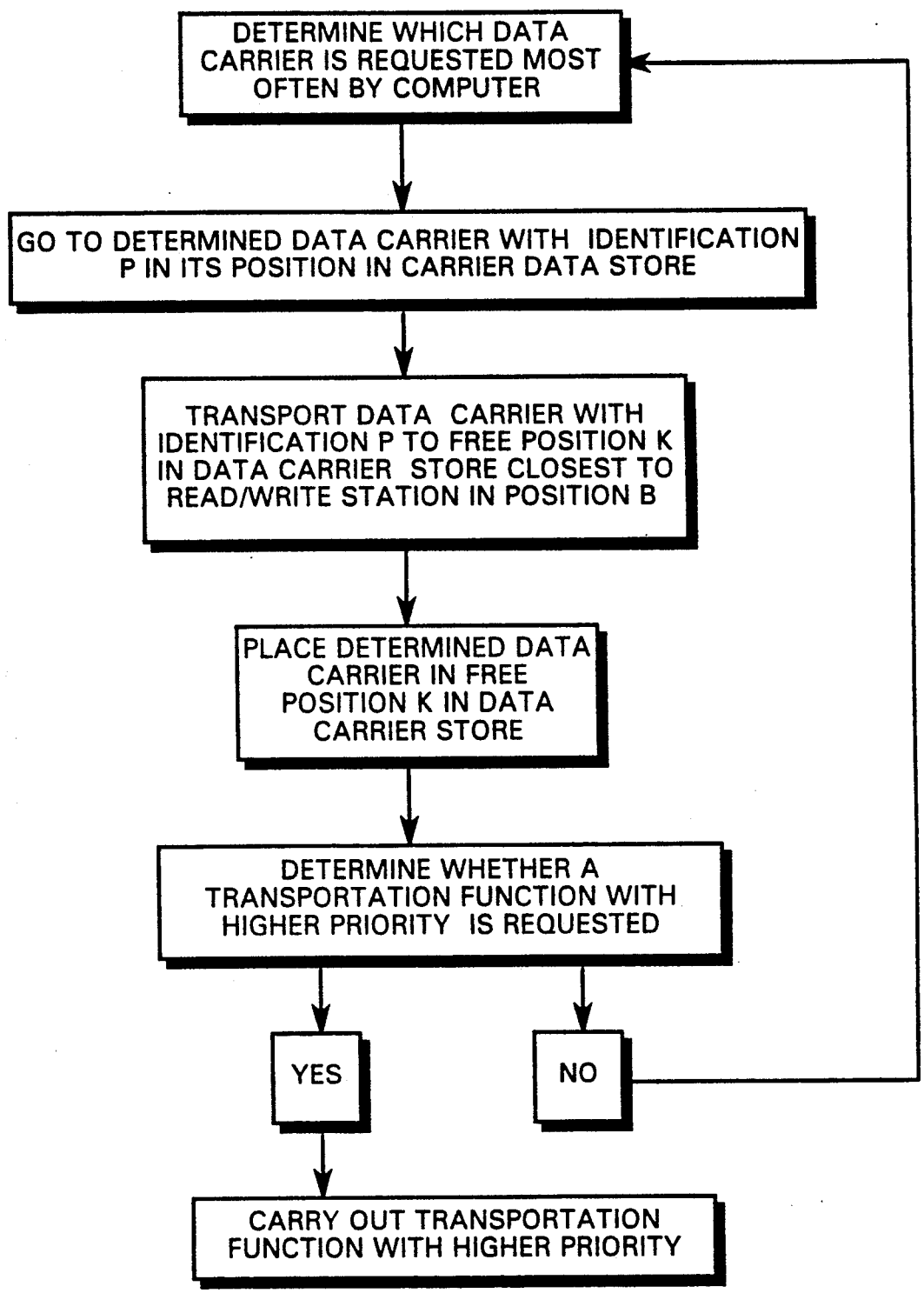

These and further advantages will be explained in more detail in the following with reference to the drawings. These show in detail:

FIG. 1—a perspective view of an inventive data carrier library;

FIG. 2—a plan view of a data carrier library;

FIG. 3—an illustration, by way of example, of a mark which is to be applied to a data carrier;

FIGS. 4(a) and 4(b)—flow charts for a preferred embodiment of the inventive method for checking the identification of a data carrier;

FIG. 5—flow chart 1 for an example of a transportation function with highest priority;

FIG. 6—flow chart 2 for a further example of a transportation function with highest priority;

FIG. 7—flow chart 3 for an example of a second transportation function;

FIG. 8—flow chart 4 for a further example of a second transportation function;

FIG. 9—flow chart 5 of a transportation function with higher priority;

FIG. 10—flow chart 6 of a further transportation function with higher priority;

FIG. 11—flow chart 7 of a further transportation function with higher priority;

FIG. 12—flow chart 8 of a further transportation function with higher priority;

FIG. 13—flow chart 9 for an example of a first transportation function;

FIG. 14—flow chart 10 for a further example of a first transportation function; and FIG. 15—flow chart 11 of a transportation function with lowest priority.

The data carrier library 10 shown in a perspective view in FIG. 1 comprises a data carrier store comprised of rotary towers 12 arranged on either side of a rail assembly 14 designed for travel of a data carrier handling device 16 thereon. A read/write station 18 for data carriers comprising several data carrier drives 20a, b, c is also arranged along the rail assembly 14. A first intermediate store 22 for data carriers in which, in particular, unrecorded or rerecordable data carriers are held in readiness for the data backup processing is arranged directly above the read/write station 18.

The data carrier library shown in FIG. 1 operates with tape cassettes 24 serving as data carriers which are stored in defined positions by means of spacers in the rotary towers 12. The handling device or the robot 16 has seven degrees of freedom. Three of the degrees of freedom are allocated to rotary movements which relate to the swivelling of the robot top part 26 and the gripper 28 articulated on the robot top part 26. In this data carrier library, both rotary movements take place about parallel axes of rotation as the tape cassettes 24 in the library 10 are already stored in the position in which they are to be inserted in insert/eject openings 30 of the drives 20a, b, c. The three drives 20a, b, c are illustrated in different modes of operation, i.e., drives 20a and b do not contain a data carrier in the illustrated state, whereas a data carrier or tape cassette 24 is inserted in drive 20c and the eject opening 30 is, therefore, closed by a cover 32.

The handling devices 16 are preferably each provided with a second intermediate store 22c—as illustrated in dashed lines in FIG. 1 and in a plan view in FIG. 2—which is movable together with these along the rail assembly 14. Hence this second intermediate store 22c is always within the gripping range of the gripper 28.

The tape cassettes 24 comprise on a narrow side thereof a mark 34 which preferably carries optical or magnetic information which can be sensed by a corresponding sensor 29 of the gripper 28 (FIG. 3).

FIG. 2 shows a plan view of an inventive data carrier library 10 wherein two robots 16a and 16b are provided in order to increase the handling capacity of the data carriers. In addition to the rotary towers 12 for the tape cassettes which have already been archived, intermediate stores 22a and 22b are directly associated with read/write stations 18a and 18b, respectively, in this data carrier library. Above all, these serve to hold in readiness empty cassettes or rerecordable cassettes 24 which are delivered to the library 10 via an in/out storage station 36.

Such data carrier libraries are disclosed, for example, in U.S. patent application Ser. No. 07/391,284, filed Sep. 8, 1989, to the contents of which reference is made in full.

Air conditioners 39, 40 ensure a uniform temperature and air humidity level within the data carrier library 10.

The data library 10 is divided up into two chambers 46, 47 which can be closed off from each other by doors 41, 42, 43. Chamber 46 accommodates the actual data carrier library, while chamber 47 serves as environmental lock and/or as operator room. Chamber 47 connects the data carrier library with the outside world via the double door 48 and grants the operating staff admission to the data library for maintenance work.

The in/out storage station 36 is in the form of a shelf and defines the only entry and exit point for data carriers of the data carrier library 10. During normal operation, the in/out storage station 36 is closed off from the outside world by a door 50.

The entire data carrier library is controlled by a control device designated 52 in FIG. 2 which has stored all information on the data carrier library and receives requests for individual data carriers from a large-scale computer 54 via a connection line.

The inventive data carrier library operates as follows:

It will be assumed that the large-scale computer 54 requests the control device 52 to transport a data carrier bearing the identification X from the data carrier store 12 to the read/write station 18, for example, position B.

This transportation procedure cited as example does not have to be a selected transportation procedure within the meaning of the claims but may also be a non-selected transportation procedure. It is, however, a question of the direct request for a data carrier in the read/write station in position B and so in accordance with the invention this request is also allocated highest priority. Hence in flow chart 1 (FIG. 5) priority 100, i.e., the highest possible priority is noted for this transportation function.

In accordance with the inventive method, a check is first made as to whether the read/write station in position B is free, i.e., whether there is no data carrier in it. If this is not the case, the procedure is as set forth in flow chart 2 or flow chart 4 which will be explained hereinbelow. If this is the case, the handling device approaches the requested data carrier bearing the identification X in position A in the data carrier store and transports it to the read/write station in position B.

After termination of this transportation, it is determined in accordance with the inventive method whether a further transportation function with highest priority is to be carried out or not. If this is not the case, the next transportation function in descending order of priority is carried out, if this is the case, the further transportation function with highest priority is carried out.

In general, if there are several transportation functions with highest or identical priority, the procedure in accordance with the inventive method is such that these are processed according to the arrival of their request in the control device 52, i.e., according to their time sequence.

In flow chart 2 (FIG. 6) representing transportation of a data carrier from a read/write station to the data carrier store, it is similarly not a question of a selected transportation function but a non-selected transportation function, likewise with priority 100, which, in particular, is necessary in order to be able to proceed, in the event of there being a data carrier in a read/write station, as illustrated in flow chart 1, if a further data carrier is to be inserted in this read/write station.

Aside from that, in flow chart 2 according to FIG. 6, the procedure is the reverse of that according to flow chart 1 and it is likewise determined after completion of the transportation to be carried out whether a further transportation function with highest priority is requested, and if so, this is carried out, if not, the next transportation function in the descending order of priority is performed.

The transportation function illustrated in FIG. 7, i.e., in flow chart 3, which likewise has priority 100, relates to part of a selected transportation procedure, namely the second transportation function thereof, which is likewise performed with highest priority.

Hence when the large-scale computer 54 requests a data carrier in the read/write station in position B, a check is first made as to whether this is free. If this is not the case, it is cleared in accordance with flow chart 2 or 4. If this is the case, the data carrier bearing the identification Y in the intermediate store in position B is transported to the read/write station in position B.

After termination of the transportation, a check is likewise made as to whether a further transportation function with highest priority is requested and, if this is the case, this is carried out, and the next transportation function in the descending order of priority is performed.

Flow chart 4, illustrated in FIG. 8, likewise relates to a second transportation function which represents part of a selected transportation procedure. This second transportation function—in contrast with the second transportation function according to flow chart 3—is not preceded by a first transportation function but is followed by a first transportation function, i.e., transportation from the intermediate store to, for example, the data carrier store or the in/out storage station.

In this embodiment according to flow chart 4, too, after performance of the transportation function, i.e., transportation of the data carrier bearing the identification Y' in the read/write station in position B to the intermediate store in position B, it is ascertained whether a further transportation function with highest priority is requested and if so, this is carried out, if not, the next transportation function in the descending order of priority is performed.

Flow chart 5, illustrated in FIG. 9, relates to a transportation function which is allocated priority 80, i.e., a priority which does not represent a highest priority but merely a high priority in the priority list of from 10 to 100 used by way of example.

In flow chart 5 of FIG. 9, insertion of a cleaning data carrier bearing the identification R in the read/ write station in position B is described. The uses of the read/write station in position B are first counted continuously by the control device 52 and after the predetermined number of uses has been reached, the cleaning procedure which triggers the transportation function with high priority illustrated in flow chart 5 is activated.

This transportation function transports the cleaning carrier bearing the identification R from its position E in the data carrier library to the read/write station in position B.

Owing to the fact that this transportation function merely has a high priority, but not the highest priority, it may be that this transportation function will not be carried out at precisely the exact time but only when no transportation function with highest priority, i.e., no transportation function according to flow charts 1 to 4, is requested.

After termination of the transportation function according to flow chart 5, a check is then likewise made as to whether a transportation function with higher priority is to be carried out and in the absence of such, the next transportation function in the descending order of priority is performed.

The transportation function according to flow chart 6 has the same priority as that according to flow chart 5 and relates to the transporting of the cleaning data carrier bearing the identification R' back into position F in the data carrier library.

This return transportation of the cleaning data carrier is carried out with exactly the reverse procedure as illustrated in flow chart 5. However, as additional feature, use of the cleaning data carrier bearing the identification R' is noted in the user store for it and at the same time a check is made as to whether the predetermined maximum number of uses of this cleaning data carrier has been reached.

If this is the case, the cleaning data carrier bearing the identification R' is barred from further use in the data carrier library and a further cleaning data carrier is released for use.

Following this, it is ascertained whether a transportation function with higher priority is to be carried out or whether one can proceed to a transportation function with low priority.

If the maximum number of uses of the cleaning data carrier bearing the identification R' has not been reached, one then skips directly to ascertaining whether a further transportation function with higher priority is to be carried out or not.

If a foreign data carrier deposited in the in/out storage station is to be read in the inventive data carrier library, the transportation functions according to flow charts 7 or 8, illustrated in FIGS. 11 and 12, are carried out. These similarly have a high priority but, for example, range after the transportation functions according to flow charts 5 and 6 in the order of priority.

After transportation of the foreign data carrier bearing the identification T to a read/write station in position B according to flow chart 7 or return transportation from this read/write station in position B to the in/out storage station, it is ascertained whether a further transportation function with higher priority is requested and if so, this is carried out, if not, one proceeds to the next transportation function in the descending order of priority.

Alternatively, however, transportation of a data carrier from the in/out storage station to the read/write station can also be performed as transportation function with highest priority, namely when the information on the foreign data carrier is directly requested by the large-scale computer 54 and it is not merely a question of transfer of the information from this foreign data carrier to a data carrier of the data carrier library independently of operation of the large-scale computer 54, which was the basis for determining the priority of the transportation function according to flow charts 7 and 8.

The embodiment illustrated in FIG. 13 of an inventive first transportation function to which a low priority is allocated relates, for example, to the transfer of recordable data carriers from the in/out storage station to the data carrier library.

Such recordable data carriers—bearing, for example, the identification S—in the in/out storage station are delivered to the inventive data carrier library and, for example, used to make the backup copies requested by the large-scale computer 54 for the disk drives of the large-scale computer.

This transportation function, by way of example, ascertains whether a recordable data carrier bearing the identification S is present in the in/out storage station and if so, this data carrier bearing the identification S is gripped in the in/out storage station and transported to the intermediate store in position I, and at the end it is again ascertained whether a transportation function with higher or lower priority is to be carried out.

In the absence of requests from the large-scale computer 54 for data carriers, in accordance with the inventive method, the data carriers 24 required for the data backup processing are preferably taken from the in/out storage station 36 and deposited in the intermediate stores 22a and 22b, as described in the flow chart of the Figure, at times when the robots 16a and 16b are under less stress. This transportation function is allocated low priority and is, for example, performed so long as there are still data carriers for the data backup processing in the in/out storage station 36.

In the same way as a recordable data carrier is transported from the in/out storage station to the intermediate store according to flow chart 9, a data carrier which has been released, for example, by the control device 52 in any other position in the data carrier store, can, however, also be transported by the first transportation function illustrated in FIG. 9 to the intermediate store.

The first transportation function illustrated in flow chart 9 of FIG. 13 is, for example, a first transportation function preceding the second transportation function according to flow chart 3.

A further first transportation function is illustrated in flow chart 10. This preferably relates to a first transportation function, i.e., removal of the data carrier bearing the identification Y' from the intermediate store following the second transportation function according to flow chart 4.

Further variants of the first transportation function carried out in accordance with flow chart 10 are, however, also conceivable, for example, transportation of a data carrier from the intermediate store to the in/out storage station.

In accordance with the inventive method, the transportation function according to flow chart 11 (FIG. 15) is carried out as continuous function. This transportation function relates to the resorting of the data carrier store 12 in such a way that the data carriers most often requested by the large-scale computer are resorted into the data carrier store such that these are arranged, as far as possible, adjacent to and hence as near as possible to the read/write stations.

This resorting is carried out continuously whenever there are no further requests for data carriers from the large-scale computer and also all first transportation functions have been performed. In accordance with flow chart 11, illustrated in FIG. 15, with the continuous function the data carrier store is constantly resorted such that in the end all data carrier stores that are often required can be reached by the handling device on as short a path as possible.

If the control device 52 of the data carrier library receives a request for a data carrier 24 from one of the rotary towers 12 during performance of the continuous function, the continuous function is interrupted and transportation of the data carrier from the store to the reading station, which has higher priority, is carried out.

To describe, by way of example, the inventive procedure, illustrating access of the gripper 28 to a data carrier, taking into consideration the mark 34 and all identifications, it will be assumed, in accordance with the inventive method, that the large-scale computer 54 communicates to the control device 52 of the data carrier library that it requires the contents of the data carrier bearing the identification X.

In this case, the individual steps presented in the flow chart in FIG. 4 are carried out by the control device 52 in accordance with the inventive method.

This means that as first step a check is made as to whether the data carrier bearing the identification X is noted in the library directory of the control device 52 as a data carrier that is present in the data carrier library.

If this is not the case, an error is immediately reported and the next transportation function is performed.

If this is the case, the control device 52 then reads the position data of the data carrier from the library directory. This indicates, for example, the position A in one of the rotary towers 12 of the data carrier store.

As next step, the control device 52 checks whether it is noted in the library directory that the data carrier bearing the identification X is barred from use.

If this is the case, an error is reported. If this is not the case, a transportation function, i.e., a complete program is called up by the control device 52 which moves the handling device with the gripper 28 and positions it in accordance with the position data filed in the library directory for the data carrier bearing the identification X such that in a reading position the sensor 29 is capable of reading the mark 34 of the data carrier in position A. This reading position is automatically calculatable for the control device 52 if the position data are known, as the mark 34 is only applied to a defined point on the data carrier cover 25.

To remove the data carriers 24 from the data carrier store, i.e., the rotary towers 12, the mark 34 on the data carrier cover 25 is first read by the sensor 29 on the gripper 28 and the identity of the data carrier determined via the outside identifying information.

FIG. 3 shows by way of example a mark 34 on a data carrier with optically recorded information in the form of a bar code 52, the marking elements of which are low-reflecting strips against a background. This mark 34 is preferably applied to a narrow side of the data carrier 24.

The control device 52 controls the handling device such that the sensor 29 can read the mark fully.

The mark 34 is first read such that the outside identification is accessible to the control device 52 which then compares this with the identification X. This comparison is necessary in order for the control device to know that the handling device has not moved to the wrong data carrier.

If the outside identification is not identical with the identification X, an error is reported and the next transportation function is performed.

If the outside identification is identical with the identification X, the sensor 29 is controlled further for recognition of the position of the data carrier.

For this purpose, the data carrier contains position identifying information, for example, in the form of a rectangular point as marking element which is used by the handling device 16 to determine the exact position of the data carrier 24 in its store position. Self-adjustment of the system is carried out with the aid of this position recognition.

With this procedure, undefined gripping and insertion of the data carriers in both the data carrier store and the read/write devices or loss of a data carrier owing to inadequate gripping by the gripper 28 during transportation are reliably avoided.

The handling device 16 now grips the data carrier in position A and transports the data carrier from position A to position B in which it is then inserted in the reading station in position B.

In addition, the control device 52 notes for the data carrier bearing the identification X in the library directory that this data carrier is now in position B.

After insertion of the data carrier in the reading station in position B, for example, reading station 18a or reading station 18b, the inside identification made on the data carrier material itself, i.e., the data carrier tape, is read by the data carrier tape being played and compared with the outside identification on the data carrier cover which was read when the data carrier was gripped.

If the inside identification and the outside identification are not identical, the data carrier in question is barred from further use in the data carrier library.

This is done firstly by a bar being noted for this data carrier in the library directory.

In addition, a report is sent to the operator that the outside identifying information on the data carrier inserted in the reading station in position B is wrong. Finally, the data carrier is transported to an in/out storage station and kept in readiness for amendment of the mark on the data carrier cover 24.

Alternatively, it is also conceivable for the data carrier not to be transported to the in/out storage station but back into the data carrier store and filed there until the data carrier is to be removed from the data carrier store and corrected. This storing in the data carrier store does not create problems because the bar is noted in the library directory and prior to transportation of a data carrier from the data carrier store to a read/write station, a check is made as to whether a bar is imposed on the data carrier to be transported or not and in the event of a bar, an error is reported and the next transportation function performed so no further time-consuming, erroneous transportations of data carriers occur.

If the inside identification is identical with the outside identification, the reading station reads, for example, the data on the data carrier material, i.e., the data tape.

Then, after completion of the reading, the data carrier is transported back into the data carrier store, and the control device 52 notes the position of the data carrier bearing the identification X in the data carrier store by this being kept in the library directory.

In each case, after the data carrier has been transported back into either the in/out storage station or the data carrier store, one proceeds to the next transportation function or alternatively to the basic function again.

The operational reliability of the inventive data library 10 is improved by the storing of the individual data carrier positions within the data carrier library, in particular within the data carrier store, being carried out in both the central computer and the control system belonging to the library in the form of the library directory which is preferably provided in a store thereof. The redundant treatment of the library directory in both the store of the computer and the store of the control system gains importance particularly when a direct connection between the central computer and the data library 10 breaks down, as there is then the possibility for the central computer to transfer information to the library via a different channel, for example, via the printing-out of request lists, the contents of which are then communicated to the control device by the operator via the console. During this emergency operation, the library directories in the central computer and in the control system are separated and carried on without acknowledgement, which otherwise occurs in the event of successful transfer of cassettes.

Once the direct connection between the control system and the central computer has been reestablished, a comparison of the library directories may be carried out. A list of commands or requests can then be compiled by the central computer for the purpose of comparison of the library directories in the restart phase.

These measures provide a maximum of error tolerance in the operation of the data carrier library 10, with simultaneous maximizing of the availability of the data present in the library for the central computer.

We claim:

1. Method for operating an automatic data carrier library which is associated with a computer as a data storing facility, said library comprising various stations, a plurality of said stations being data carrier stores and at least another of said stations being a read/write station for said data carriers, said library further comprising means for carrying out transportation procedures of said data carriers between one and another of said stations and a control device for controlling said transportation procedures, wherein said method comprises:

using transportation procedures for transporting one of said data carriers between a first one and a second one of said stations, each of said transportation procedures comprising at least one transportation function having a priority associated therewith;

separating said transportation procedures into internal transportation procedures for rearranging said data carriers within said plurality of data carrier stores and into direct request transportation procedures for transporting a data carrier from its data carrier store directly into said read/write station;

providing said transportation functions of said internal transportation procedures with priorities which are lower than the priorities of said transportation functions of said direct request transportation procedures;

arranging called-up transportation functions in a sequence within said control device; and executing a transportation function with a higher priority with precedence over a transportation function with a lower priority.

2. Method for operating an automatic data carrier library said library being associated with a computer as a data storing facility, said library comprising various stations, a plurality of said stations being data carrier stores and at least another of said stations being a read/write station for said data carriers, said library further comprising a transport device for carrying out transportation procedures of said data carriers between one and another of said stations and a control device for controlling said transportation procedures, wherein said method comprises:

using transportation procedures for transporting one of said data carriers between a first one and a second one of said stations, each transportation procedure comprising at least one transportation function having a priority associated therewith;

separating said transportation procedures into internal transportation procedures for rearranging said data carriers within said plurality of data carrier stores and into direct request transportation procedures for transporting a data carrier from its data carrier store directly into said read/write station;

providing said transportation functions of said internal transportation procedures with priorities which are lower than the priorities of said transportation functions of said direct request transportation procedures;

arranging called-up transportation functions in a sequence within said control device; and executing a transportation function with a higher priority with precedence over a transportation function with a lower priority.

3. Method as defined in claim 1, wherein in the event a data carrier is located in a read/write station, prior to transportation of a further data carrier to this read/write station, removal of said data carrier located therein is carried out prior to transportation of said further data carrier.

4. Method as defined in claim 1, wherein an in/out storage station is provided as further station.

5. Method as defined in claim 4, wherein said transportation procedures involving said in/out storage station are carried out in accordance with said transportation procedures involving said data carrier stores.

6. Method for operating an automatic data carrier library which is associated with a computer as a data storing facility, said library comprising various stations, a plurality of said stations being data carrier stores and at least another of said stations being a read/write station for said data carriers, wherein said method comprises:

using a transportation procedure for transporting said data carriers between a first one and a second one of said stations, each transportation procedure comprising at least one transportation function having a priority associated therewith;

separating said transportation procedures into internal transportation functions for rearranging said data carriers within said plurality of stores and direct request transportation functions for transporting a data carrier from its data carrier store directly into said read/write station;

providing said internal transportation functions with priorities which are lower than the priorities of said direct request transportation functions;

providing within said plurality of stores an intermediate store for selected transportation procedures between one of said data carrier stores and said read/write station;

using a first transportation function which is an internal transportation function between said one of said data carrier stores and said intermediate store and a second transportation function between said intermediate store and said read/write station for performing said selected transportation procedures; and executing called-up transportation functions in a sequence according to the height of their priorities.

7. Method for operating an automatic data carrier library which is associated with a computer as a data storing facility, said library comprising various stations, a plurality of said stations being data carrier stores and at least another of said stations being a read/write station for said data carriers, wherein said method comprises:

using a transportation procedure for transporting one of said data carriers between a first one and a second one of said stations each transportation procedure comprising at least one transportation function having a priority associated therewith;

separating said transportation procedures into internal transportation functions for rearranging said data carriers within said plurality of stores and direct request transportation functions for transporting a data carrier from its data carrier store directly into said read/write station;

providing said internal transportation functions with priorities which are lower than the priorities of said direct request transportation functions;

providing within said plurality of stores an intermediate store for selected transportation procedures between said read/write station and one of said data carrier stores;

using a first transportation function which is an internal transportation function between said intermediate store and one of said data carrier stores and a second transportation function between said read/write station and said intermediate store for performing said selected transportation function; and executing called-up transportation functions in a sequence according to the height of their priorities.

8. Method as defined in claim 6, wherein said selected transportation procedure is a predictable transportation procedure for a data carrier from or to said read/write station.

9. Method as defined in claim 7, wherein said selected transportation procedure is a predictable transportation procedure for a data carrier from or to said read/write station.

10. Method as defined in claim 8, wherein said predictable transportation procedure is one of an empty or recordable data carrier.

11. Method as defined in claim 9, wherein said predictable transportation procedure is one of an empty or recordable data carrier.

12. Method as defined in claim 6, wherein said intermediate store is defined as storage area within close access to said data carrier stores.

13. Method as defined in claim 6, wherein said intermediate store is arranged in short distance of read/write stations.

14. Method as defined in claim 6, wherein said intermediate store is moved along with said handling device.

15. Method as defined in claim 7, wherein said intermediate store is defined as storage area within close access to said data carrier stores.

16. Method as defined in claim 7, wherein said intermediate store is arranged in short distance of read/write stations.

17. Method as defined in claim 7, wherein said intermediate store is moved along with said handling device.

18. Method as defined in claim 6, wherein a transportation function for checking the availability of individual data carriers in said data carrier store is allocated a low priority.

19. Method as defined in claim 6, wherein a transportation function for resorting said data carriers within said data carrier store is allocated low priority.

20. Method as defined in claim 6, wherein insertion of cleaning data carrier is carried out with a transportation function having a priority which is lower than the highest priority.

21. Method as defined in claim 19, wherein the transportation function with lowest priority is carried out in continuous operation, where required interrupted by transportation functions of higher priority.

22. Method as defined in claim 1, wherein the allocation of the priorities to the individual transportation functions is changeable during operation of the library.

23. Method as defined in claim 1, further comprising identifying said data carriers to be transported via a mark sensible from outside prior to removal from the data carrier store.

24. Method as defined in claim 23, further comprising using optical and/or magnetic identification carriers as marks.

25. Method as defined in claim 1, further comprising determining the exact position of said data carrier in said respective data carrier store prior to removal of said data carriers from said store.

26. Method as defined in claim 23, wherein prior to insertion of the data carrier in said read/write station, the method further comprises ascertaining an identification applied to said data carrier itself and comparing said identification with said identification ascertained from said mark.

27. Method for operating an automatic data carrier library, with data carriers being transported back and forth between various stations of said library with said stations of said library including at least one data carrier store, an intermediate store and one read/write station for said data carriers, said method comprising:
using transportation functions for said data carriers, said transportation functions being optionally selectable by a control device;
allocating a priority to each transportation function;
executing a transportation function with higher priority with precedence over a transportation function with lower priority;
dividing transportation of data carriers from a first to a second station which is often required into a first transportation function relating to transportation of said data carriers between said data carrier store and said intermediate store and a second transportation function relating to transportation of said data carriers between said intermediate store and said read/write station;
arranging said intermediate store close to said respective second station; and
allocating a low priority to said first transportation function and a high priority to said second transportation function.

28. Method for operating an automatic data carrier library, with data carriers being transported back and forth between various stations of said library with said stations of said library including at least one data carrier store, an intermediate store and one read/write station for said data carriers, said method comprising:
using transportation functions for said data carriers, said transportation functions being optionally selectable by a control device;
allocating a priority to each transportation function;
executing a transportation function with higher priority with precedence over a transportation function with lower priority;
dividing transportation of data carriers from a first to a second station requiring long transportation paths of said handling device into a first transportation function relating to transportation of said data carriers between said data carrier store and said intermediate store and a second transportation function relating to transportation of said data carriers between said intermediate store and said read/write station,
arranging said intermediate store close to said respective second station; and
allocating a low priority to said first transportation function and a high priority to said second transportation function.

29. A method for operating an automatic data carrier library system to provide a computer with access to data carriers, said library system comprising:
rerecordable and other data carriers;
a store for said data carriers;
at least one read/write station for said data carriers, said read/write station being provided with an insertion opening and being connected with said computer for reading and writing on a data carrier inserted in said read/write station; and
an intermediate store above said insertion opening for storing rerecordable data carriers;
said method comprising the following steps;
transporting one of said rerecordable data carriers from said store to said intermediate store in a time period in which there is no direct request from said computer for any of said data carriers;
storing said rerecordable data carrier in an intermediate position in said intermediate store; and
transporting said rerecordable data carrier into said read/write device upon a direct request for said data carrier by said computer.

30. A method for operating an automatic data carrier library system to provide a computer with access to data carriers, said library system comprising:
a store for said data carriers;
at least one read/write station for said data carriers, said read/write station being connected with said computer for reading and writing on a data carrier inserted in said read/write station; and
an intermediate store adjacent said read/write station
said method comprising the following steps;
a first transportation function being carried out before a request for a data carrier for said read/write station by said computer said first transportation function being used to transport one of said data carriers before it is requested by said computer from said store to said intermediate store;
a second transportation function being the first to be carried out at a request by said computer; and
said second transportation function being used to transport said data carrier from said intermediate store into said read/write station.

31. A method for operating an automatic data carrier library system to provide a computer with access to data carriers, said library system comprising:
a store for said data carriers;
at least one read/write station for said data carriers, said read/write station being connected with said computer for reading and writing on a data carrier inserted in said read/write station; and
an intermediate store adjacent said read/write station
said method recognizing a predictable procedure for transporting a rerecordable data carrier from said store to said read/write station and in the case of such a predictable procedure comprising the following steps:

a first transportation function according to which one of said rerecordable data carriers is firstly placed with foresight in said intermediate store;

a second transportation function is performed when a request for said rerecordable data carrier is received from said computer, said second transportation function transporting said data carrier from said intermediate store into said read/write station.

32. Automatic data carrier library for performing a method according to one of claims 29-31, comprising:
a plurality of said data carrier stores,
a read/write station;
a transport device for transporting said data carriers between said data carrier store and said read/write station; and
an intermediate store for selected data carriers arranged on said read/write station and use for intermediate storage of said selected data carriers before insertion into said read/write station.

33. Data carrier library as defined in claim 32, wherein said selected data carriers are empty or rerecordable data carriers.

34. Data carrier library as defined in claim 32, wherein said data carriers are positionable in said intermediate store such that they assume in said intermediate store an orientation which is substantially parallel to that in said read/write device.

35. Data carrier library as defined in claim 32, wherein said intermediate store is arranged above said read/write station.

36. Data carrier library as defined in claim 32, wherein said read/write station is provided with an insertion opening for said data carriers and that said intermediate store is arranged directly above said insertion opening.

37. Data carrier library as defined in claim 32, wherein an in/out storage station is provided for data carriers.

38. Automatic library system for providing a computer with access to data carriers comprising:
rerecordable and other data carriers;
a store for said data carriers;
a read/write station for said data carriers comprising an in/out opening;
an intermediate store arranged adjacent said in/out opening for an intermediate storage of said rerecordable data carriers in intermediate storage positions adjacent said read/write station;
said rerecordable data carriers in said intermediate storage positions being aligned with said in/out opening;
a handling device for transporting said rerecordable data carriers between said store and said intermediate store; and
a controller and capable of having one of said rerecordable data carriers transported by said handling device to said intermediate store without a direct request for said data carrier by said computer during times in which the handling system does not handle a direct request; wherein
said controller initiates transportation of said data carrier from said intermediate store into said read/write station upon a direct request by said computer.

39. Automatic library system for providing a computer with access to data carriers comprising:
a store for said data carriers;
a read/write station for said data carriers comprising an in/out opening;
an intermediate store arranged above said in/out opening for an intermediate storage of said data carriers in intermediate storage positions adjacent said read/write station;
said intermediate storage positions being oriented substantially parallel to a position of a data carrier when inserted into said read/write station;
a handling device for transporting said data carriers between said store and said intermediate store; and
a means for controlling said library system capable of having one of said intermediate store without a direct request for said data carrier by said computer in times in which the handling system does not handle a direct request; wherein
said means for controlling initiates a transport of said data carrier from said intermediate store into said read/write station upon a direct request by said computer.

40. Automatic library system for providing a computer with access to data carriers comprising:
a store for said data carriers;
a read/write station for said data carriers comprising a read/write device with an in/out opening;
an intermediate store arranged adjacent said read/write device for an intermediate storage of said data carriers in intermediate storage positions adjacent said read/write station;
said data carriers in said intermediate storage positions being aligned with said in/out opening;
a handling device for transporting said data carriers between said store and said intermediate store
a controller for controlling said library system, wherein
said controller recognizes first and second kinds of data carriers and initiates a transport of one of said first kind of data carriers from said store to said read/write station by said handling device upon a direct request by said computer, and wherein
said controller causes said second kind of data carriers to be transported by said handling device to said intermediate store without a direct request for said second kind of data carrier by said computer in times in which the handling system does not handle a direct request, and wherein
said controller further initiates a transport of said second kind of data carrier from said intermediate store into said read/write station upon a direct request of one second kind data carrier by said computer.

41. Automatic library system for providing a computer with access to data carriers comprising:
a store for said data carriers;
a read/write station for said data carriers;
a handling device for transporting said data carriers between said store and said read/write station;
said handling device comprising a carriage being movable on a track running alongside said store and said read/write device; and
an intermediate store for said data carriers arranged on said carriage so as to move along on said track with said handling device.

42. Automatic library system according to claim 41, wherein said intermediate store is arranged within a gripping range of said handling device.

* * * * *

UNITED STATES PATENT AND TRADEMARK OFFICE
CERTIFICATE OF CORRECTION

PATENT NO. : 5,291,001
DATED : March 1, 1994
INVENTOR(S) : Werner F. KRAYER et al It is certified that error appears in the above-indentified patent and that said Letters Patent is hereby corrected as shown below:

Column 26, line 18, insert --data carriers transported by said handling device to said--between "said" and "intermediate".

Signed and Sealed this

Twentieth Day of September, 1994

Attest:

BRUCE LEHMAN

Attesting Officer   Commissioner of Patents and Trademarks